United States Patent
Chen et al.

(10) Patent No.: US 10,866,502 B2
(45) Date of Patent: Dec. 15, 2020

(54) GLASS-FREE 3D DISPLAY SYSTEM USING DUAL IMAGE PROJECTION AND TRI-COLORS GRATING MULTIPLEXING PANELS

(71) Applicants: Duan-Jun Chen, East Brunswick, NJ (US); Jason Chen, East Brunswick, NJ (US)

(72) Inventors: Duan-Jun Chen, East Brunswick, NJ (US); Jason Chen, East Brunswick, NJ (US)

(*) Notice: Subject to any disclaimer, the term of this patent is extended or adjusted under 35 U.S.C. 154(b) by 231 days.

(21) Appl. No.: 16/097,225

(22) PCT Filed: Apr. 12, 2017

(86) PCT No.: PCT/US2017/027098
§ 371 (c)(1),
(2) Date: Oct. 26, 2018

(87) PCT Pub. No.: WO2017/189230
PCT Pub. Date: Nov. 2, 2017

(65) Prior Publication Data
US 2020/0326620 A1    Oct. 15, 2020

Related U.S. Application Data

(60) Provisional application No. 62/391,427, filed on Apr. 29, 2016, provisional application No. 62/496,257, filed on Oct. 9, 2016.

(51) Int. Cl.
*G03B 21/60* (2014.01)
*G03B 35/22* (2006.01)
*G02B 30/26* (2020.01)

(52) U.S. Cl.
CPC ............. *G03B 35/22* (2013.01); *G02B 30/26* (2020.01); *G03B 21/60* (2013.01)

(58) Field of Classification Search
CPC ...... G03B 21/00; G03B 21/60; G03B 21/147; G03B 21/602; G03B 21/606;
(Continued)

(56) References Cited

U.S. PATENT DOCUMENTS

2004/0080938 A1    4/2004 Holman
2007/0183045 A1    8/2007 Schilling
(Continued)

FOREIGN PATENT DOCUMENTS

WO    WO 2014/033699    3/2014

OTHER PUBLICATIONS

International Search Report ("ISR") dated Feb. 14, 2018 (4 pgs.) with cover sheet (1 pg.) and Written Opinion of the International Searching Authority (6 pgs.), from corresponding International Application No. PCT/US2017/027098.
(Continued)

*Primary Examiner* — Sultan Chowdhury
(74) *Attorney, Agent, or Firm* — John C. Pokotylo; Pokotylo Patent Services

(57) ABSTRACT

The problem of 3D panel display systems either (a) requiring special glasses to separate left and right viewing images, or (b) having auto-stereoscopic 3D with compromised fidelity, is solved by providing a projection three dimensional (3D) display system for providing glass-free, 3D display to a plurality of viewing volumetric pairs (VVAs) in space corresponding to a hypothetical plurality of viewers' eye aperture pairs, the projection 3D display system comprising: (a) a dual-image projector configured to project both a left viewing tri-color image and a right viewing tri-color image; and (b) means for (1) receiving a tri-color mixed input beam encompassing the left and right viewing tri-color images, (2) multiplying the tri-color mixed input beam into a plurality of (Continued)

tri-color mixed output beams, and (3) focusing the plurality of tri-color mixed beams for viewing at the VVAs.

23 Claims, 31 Drawing Sheets

(58) Field of Classification Search
CPC ...... G03B 21/625; G03B 35/10; G03B 35/12; G03B 35/18; G03B 35/20; G03B 35/22; G03B 35/24; H04N 13/302; H04N 13/324; H04N 13/349; H04N 13/363; H04N 13/388; H04N 13/395; H04N 13/398; G02B 30/26; G02B 30/27; G02B 30/30; G02B 30/52
See application file for complete search history.

(56) References Cited

U.S. PATENT DOCUMENTS

| | | | |
|---|---|---|---|
| 2008/0192152 A1 | 8/2008 | Facius | |
| 2013/0342813 A1* | 12/2013 | Wang | G02B 30/35 353/7 |
| 2014/0168051 A1* | 6/2014 | Smoot | G09G 5/18 345/102 |

OTHER PUBLICATIONS

PCT Notification Concerning Transmittal International Preliminary Report on Patentability ("IPRP"), dated Nov. 8, 2018, to corresponding International Application No. PCT/US2017/027098 (8 pgs.).

\* cited by examiner

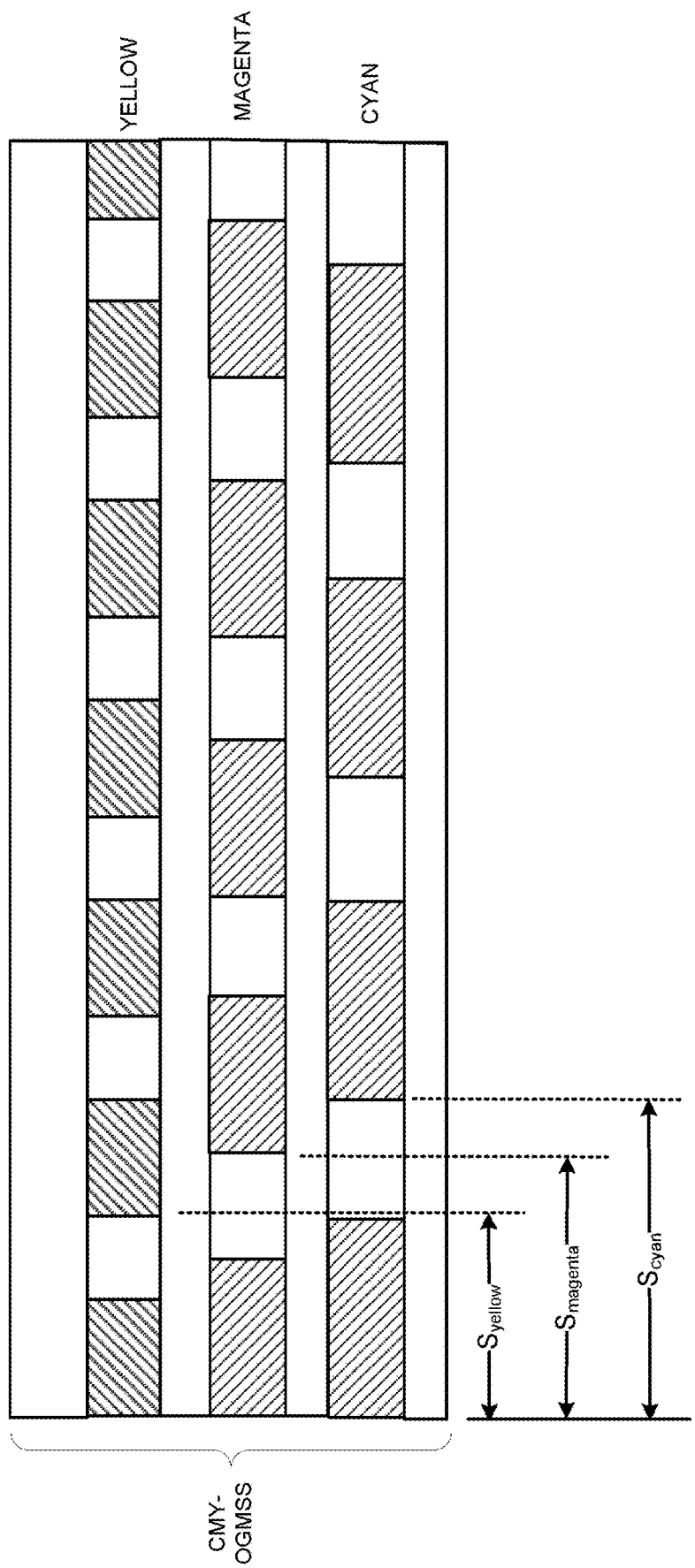

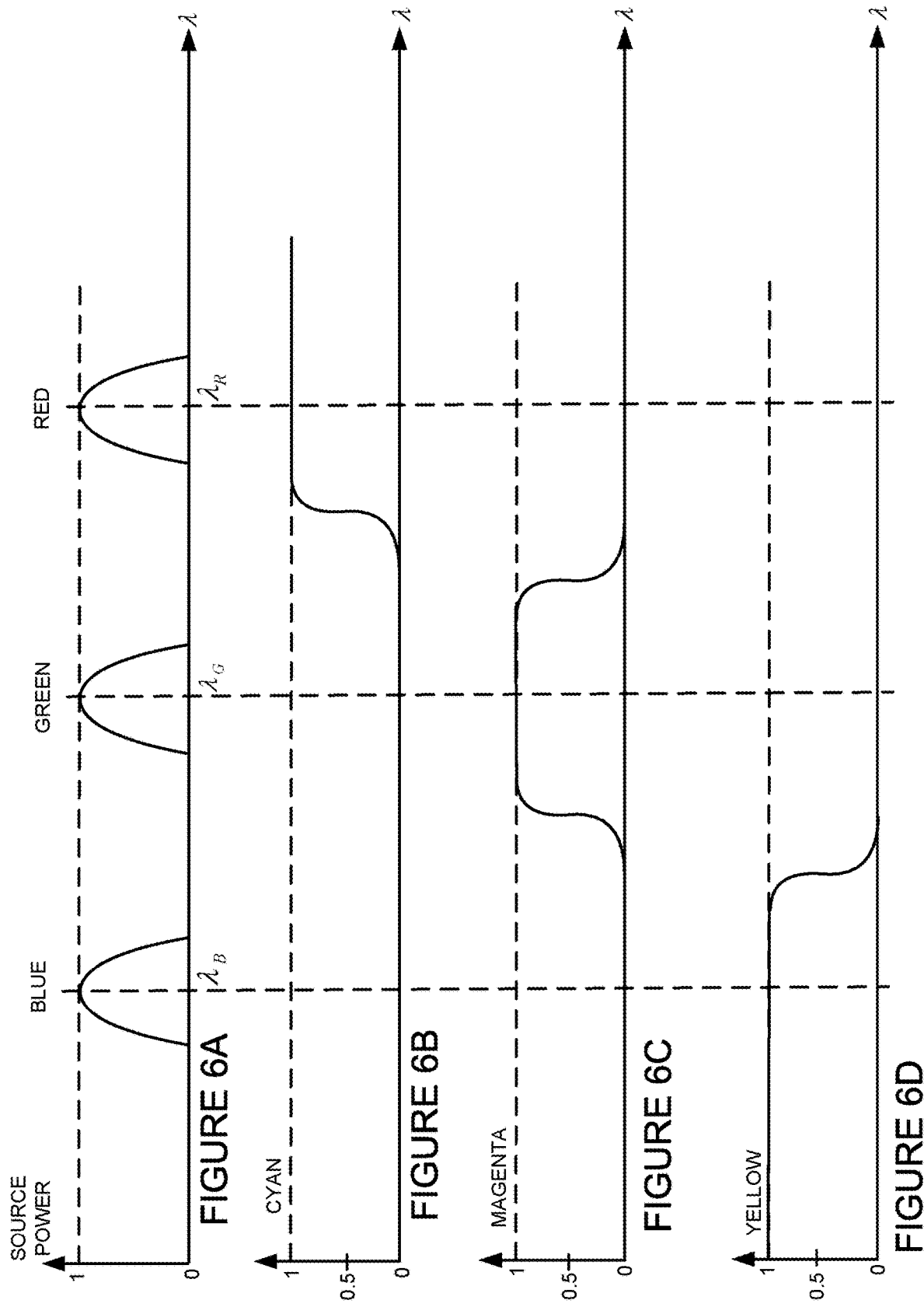

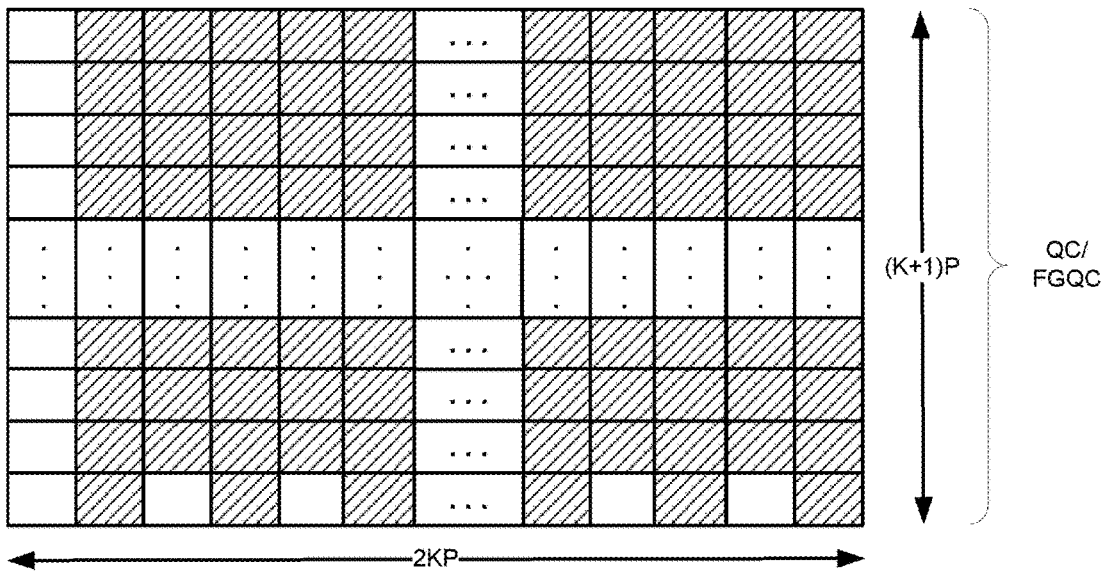
FIGURE 13A
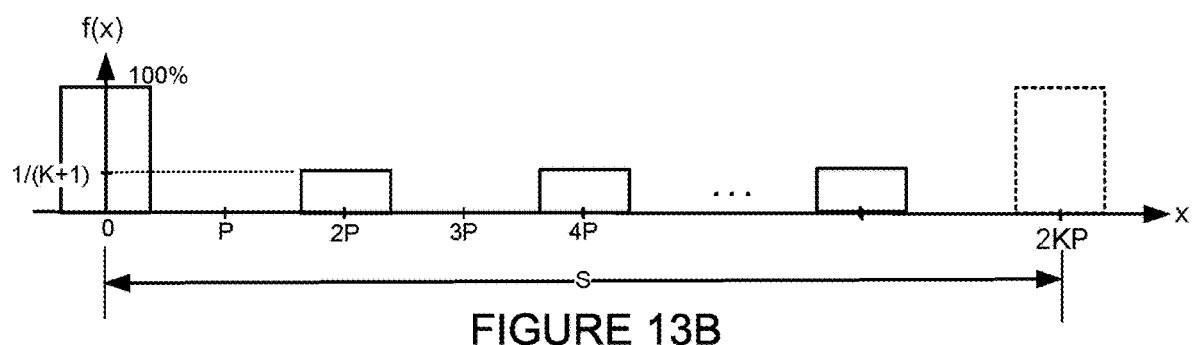
FIGURE 13B
FIGURE 13C
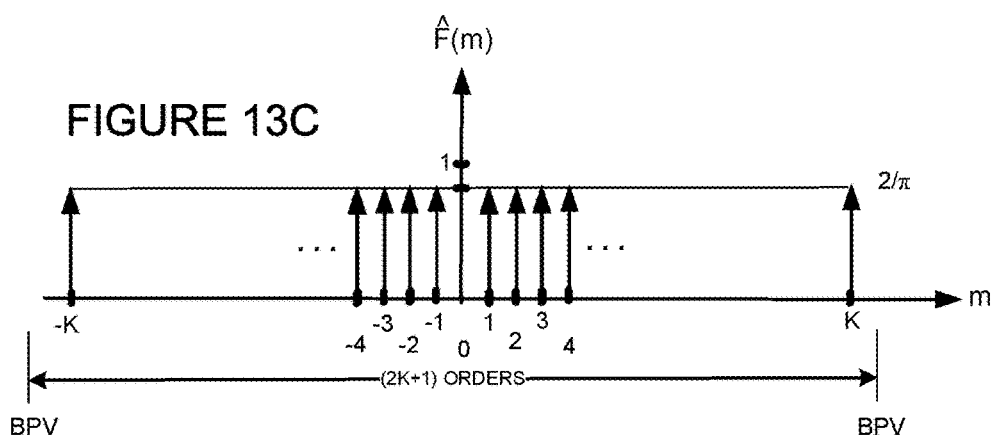

US 10,866,502 B2

GLASS-FREE 3D DISPLAY SYSTEM USING DUAL IMAGE PROJECTION AND TRI-COLORS GRATING MULTIPLEXING PANELS

§ 1. RELATED APPLICATIONS

This application claims benefit to each of: (1) U.S. Provisional Application Ser. No. 62/496,257 (referred to as "the '257 provisional" and incorporated herein by reference), titled "GLASS-FREE 3D DISPLAY SYSTEM VIA DUAL IMAGE PROJECTION AND TRI-COLORS GRATING PANELS," filed on Oct. 9, 2016 and listing Duan-Jun Chen and Jason Chen as the inventors; and (2) U.S. Provisional Application Ser. No. 62/391,427 (referred to as "the '427 provisional" and incorporated herein by reference), titled "3D PROJECTIVE MOVIE THEATER SYSTEM WITHOUT WEARING GLASSES," filed on Apr. 29, 2016 and listing Duan-Jun Chen as the inventor. The scope of the present invention is not limited to any requirements of the specific example embodiments described in the '257 provisional application, or any requirements of the specific example embodiments described in the '427 provisional.

§ 2. BACKGROUND OF THE INVENTION

§ 2.1 Field of the Invention

The present invention concerns three-dimensional ("3D") panel display systems and methods. In particular, the present invention concerns auto-stereoscopic (e.g., glass-free) 3D display systems and methods.

§ 2.2 Background Information

§ 2.2.1 Glass-Based 3D Display 3D panel displays using separate left and right sub-pixels and special glasses worn by spectators for separating left and right image signals are known. Some 3D displays have used glasses with red and blue filters to separate left and right image signals. More recent 3D displays have used vertically and horizontally polarized lenses to separate left and right image signals, and even left-handed and right-handed circularly polarized lenses to separate left and right image signals. So called "active-glass" systems activate alternately left and right shutters of crystal-based glasses in synchronization with left and right displayed images.

However, people often prefer not to have to wear the glasses required for glass-based 3D display systems, especially people who wear prescription glasses and/or people with atypical facial features. Therefore, it would be useful to provide a 3D display system that does not require special glasses to separate left and right images.

§ 2.2.2 Glass-Free (Auto-Stereoscopic) 3D Display

Some known systems use a parallax barrier, or an arrangement of lenticular lenslets to provide glass-free 3D display. In some systems, Fresnel lenticular lenslets are used to reduce the thickness of the display.

Although such systems can provide glass-free 3D display, their fidelity has been limited by crosstalk between left and right images, blurry objects, and limited depth of field, especially when multiple viewing positions are considered. For example, such glass-free 3D display systems do not always separate the left and right image signals perfectly. That is, some of the left image signal can sometimes reach the right eye, and vice-versa. This may be referred to as "crosstalk". It would be useful to have a 3D display system with reduced crosstalk, or without any crosstalk.

In view of the foregoing, it would be useful to provide a 3D display system which does not require viewers to wear any glasses in order to separate left and right images, and which can be viewed simultaneously and with improved fidelity (e.g., better image sharpness, better contrast, and/or better 3D effects with increased depth of fields) and improved viewer comfort, in proper 3D, by more than one viewer.

§ 3. SUMMARY OF THE INVENTION

The present inventors believe that the main problem with current glass-free 3D panel display systems is that they use geometric optical design based on ray tracing. Unfortunately, however, when viewers are several meters or even farther away (at far field) from the display screen, typical geometric ray-tracing designs cause large aberrations to occur. The problem of 3D panel display systems either (a) requiring special glasses to separate left and right images, or (b) having auto-stereoscopic 3D with compromised fidelity, is solved by providing a projection three dimensional (3D) display system for providing glass-free, 3D display to a plurality of viewing volumetric pairs (VVAs) in space corresponding to a hypothetical plurality of viewers' eye aperture pairs, the projection 3D display system comprising: (a) a dual-image projector configured to project both a left viewing tri-color image and a right viewing tri-color image; and (b) means for (1) receiving a tri-color mixed input beam encompassing the left and right viewing tri-color images, (2) multiplying the tri-color mixed input beam into a plurality of tri-color mixed output beams, and (3) focusing the plurality of tri-color mixed beams for viewing at the VVAs.

In some example embodiments consistent with the present invention, the means for receiving, multiplying and focusing include a CMY-Orchestrated Grating Multiplexing Sandwich Screen ("CMY-OGMSS") comprising three layers of amplitude-modulated absorption gratings, each of the three layers made of cyan, magenta and yellow ("CMY") colored gratings, respectively, wherein cyan, magenta and yellow grating lines are arranged parallel with respect to each other, the three grating layers are constructed one on top of another in a sandwich-style, and pitch values of the corresponding cyan, magenta and yellow gratings are mutually-orchestrated designed according to Equations (1) and (2), set forth below.

In some other example embodiments consistent with the present invention, the means for receiving, multiplying and focusing include an RGB-Orchestrated Grating Multiplexing Quadri-prism (RGB-OGMQ) having (i) a porting area for receiving mixed tri-color input beams and transmitting mixed tri-color output beams, (ii) a pair of cross-positioned hot and cold mirrors to split one multi-color mixed input beam into separate-oriented red, green and blue (i.e., RGB) beams, and recombines returned red, green and blue beams into one mixed multi-color output beam, wherein the hot mirror reflects red lights and transmits green and blue lights, and the cold mirror reflects blue lights and transmits green and red lights, (iii) three inner reflecting panel surfaces to reflect three split red, green and blue color beams back along their reversed directions, respectively, and (iv) three-colored diffraction grating screens attached onto the three inner reflecting panel surfaces, respectively, wherein pitch values of the corresponding red, green and blue gratings are mutually-orchestrated (e.g., designed according to Equations (1) and (9), set forth below).

§ 4. BRIEF DESCRIPTION OF THE DRAWINGS

FIG. 5 illustrates a horizontal cross-sectional view of an example CMY-OGMSS panel device.

FIGS. 6A-6D illustrate a relationship between red/green/blue sourcing wavelengths and spectral absorbance of cyan/magenta/yellow ("CMY") grating layers, in which FIG. 6A illustrates power spectra/wavelengths of red, green and blue ("RGB") sourcing colors, FIG. 6B illustrates absorbance spectrum of cyan grating layer, FIG. 6C illustrates absorbance spectrum of magenta grating layer, and FIG. 6D illustrates absorbance spectrum of yellow grating layer.

Figure 7A:
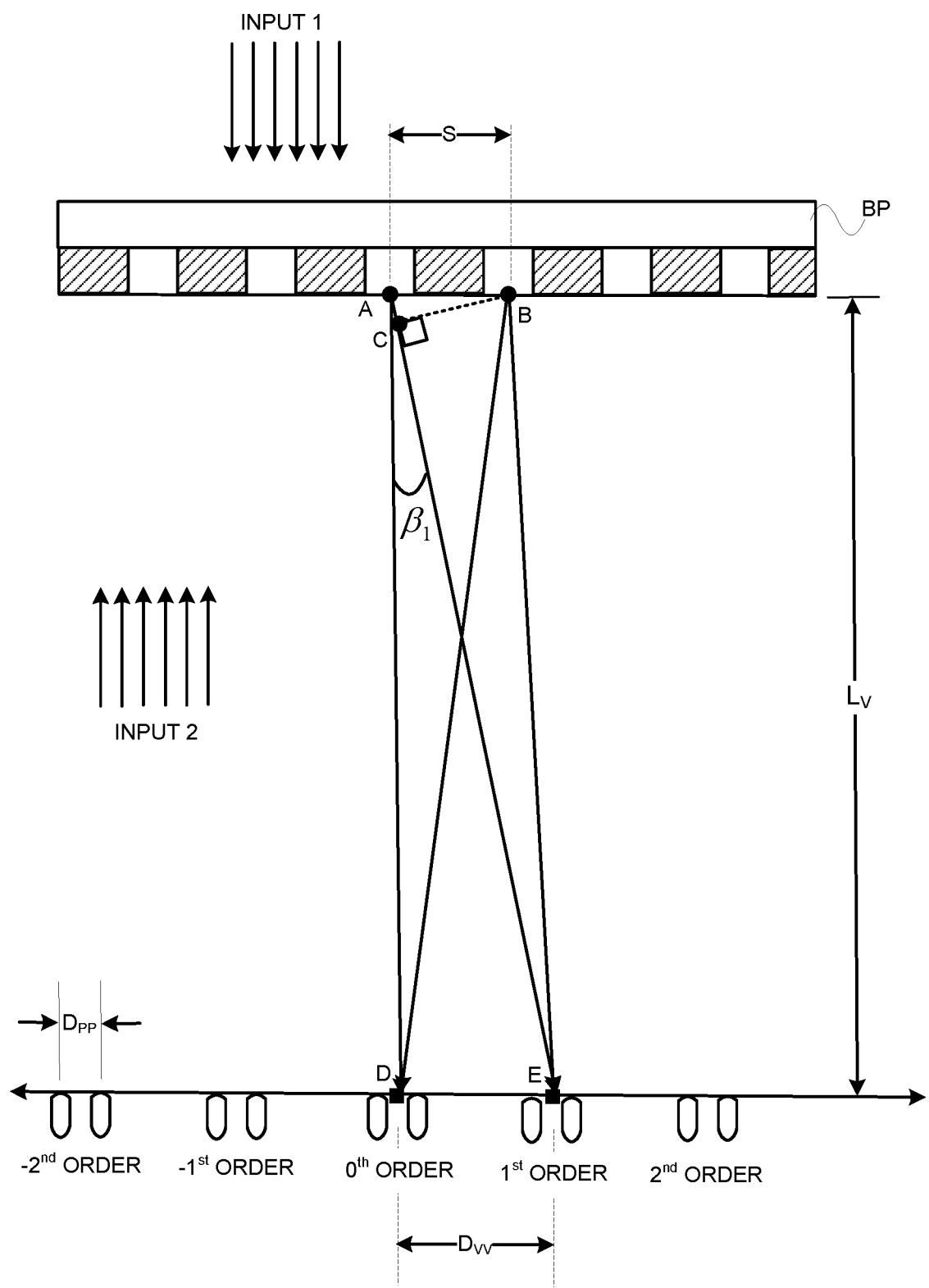
Figure 7B:
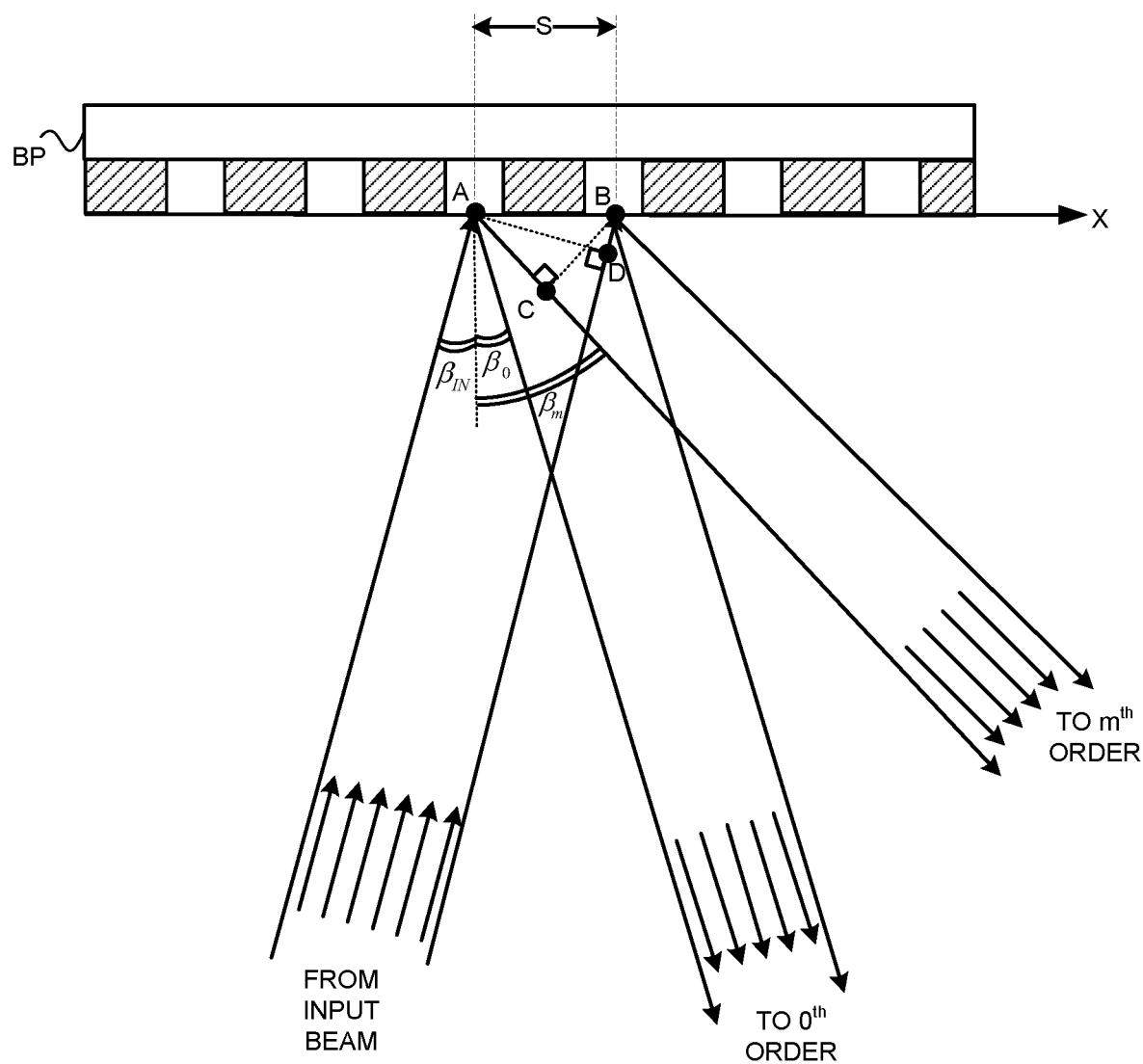

FIG. 7A illustrates a relationship between a design value of grating space, viewer-to-grating distance, and a viewer-to-viewer lateral distance demonstrated via first order diffraction of a grating, whereas normal illumination beams are projected from rear-side or front-side of grating panel (INPUT-1 and INPUT-2); FIG. 7B illustrates angular multiplications of output beams via an $m^{th}$ order diffraction of a grating, whereas a generally oblique illumination beam is projected from front-side of grating panel.

Figure 8A:
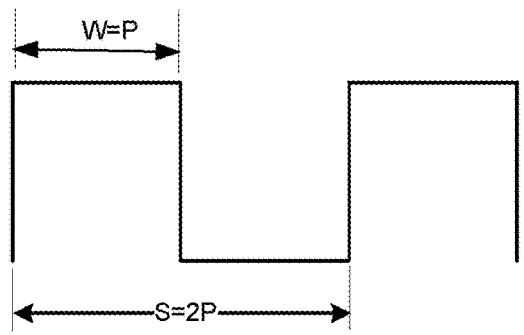
Figure 8B:
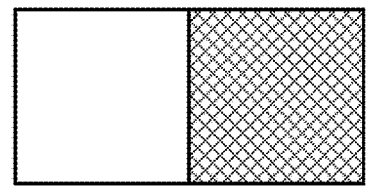
Figure 8C:
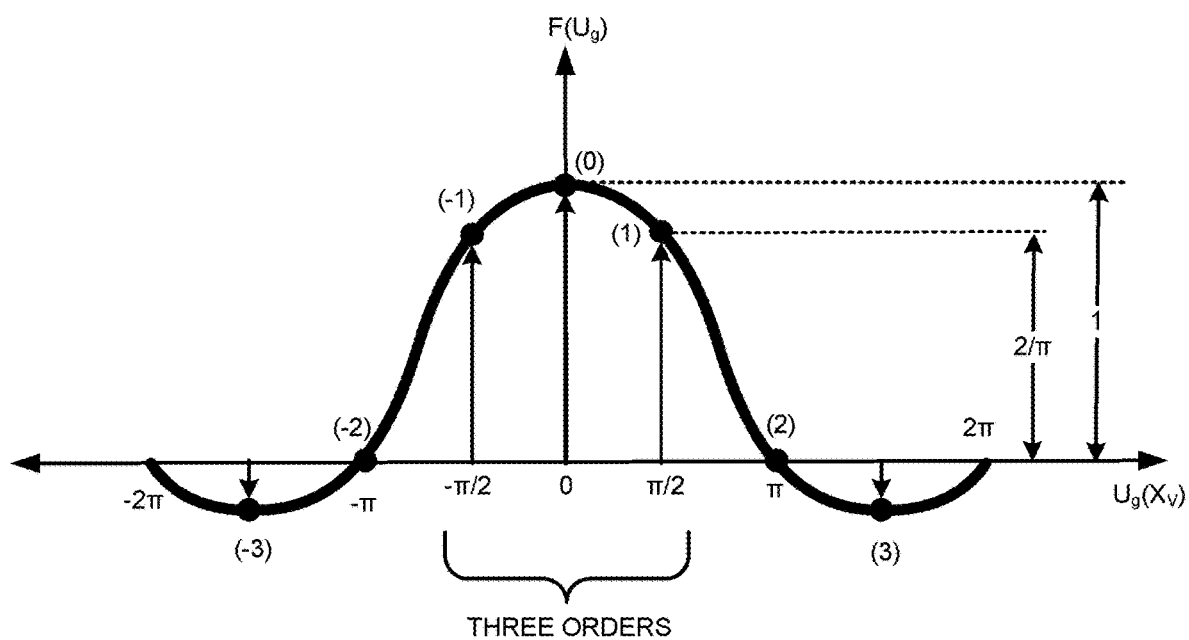

FIGS. 8A-8C illustrate an example of a square-wave amplitude-absorptive grating in which FIG. 8A illustrates a grating space transmission pattern, FIG. 8B illustrates a pixel space (half-tone dots) implementation and FIG. 8C illustrates a far-field diffraction power distribution.

Figure 9A:
Figure 9B:
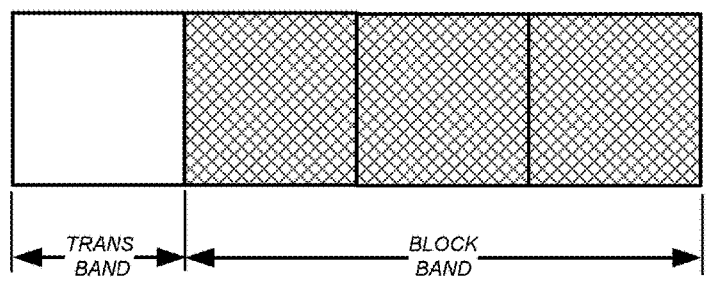
Figure 9C:
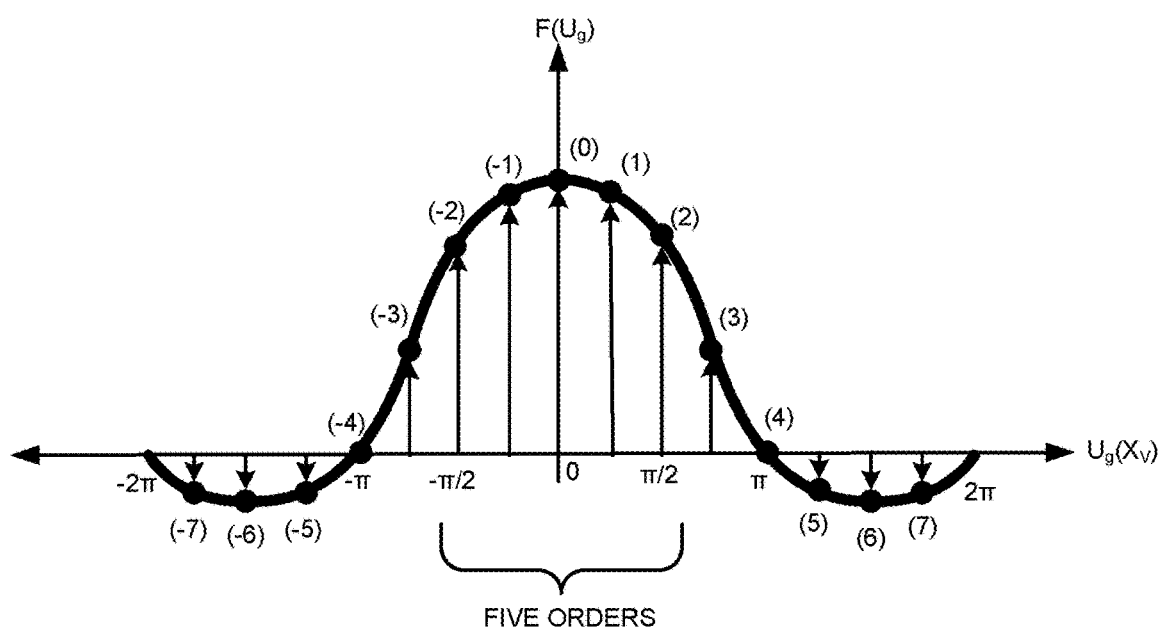

FIGS. 9A-9C illustrate an example of a square-wave amplitude-absorptive grating in which FIG. 9A illustrates a grating space transmission pattern, FIG. 9B illustrates a pixel space (half-tone dots) implementation and FIG. 9C illustrates a far-field diffraction power distribution.

Figure 10A:
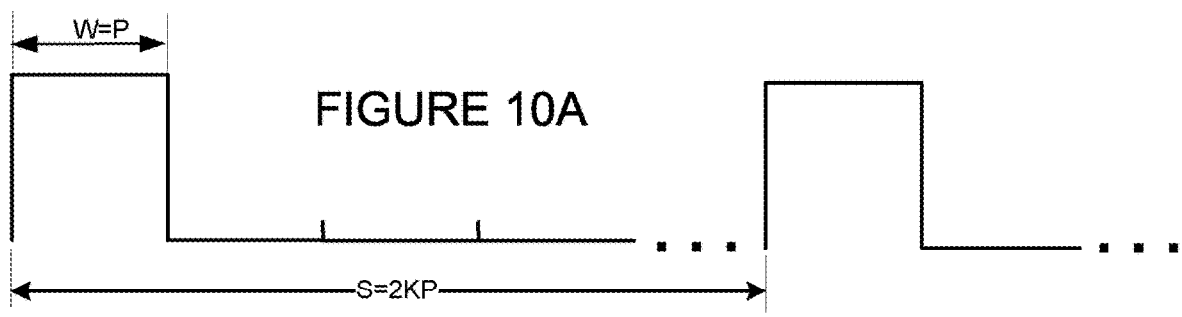
Figure 10B:
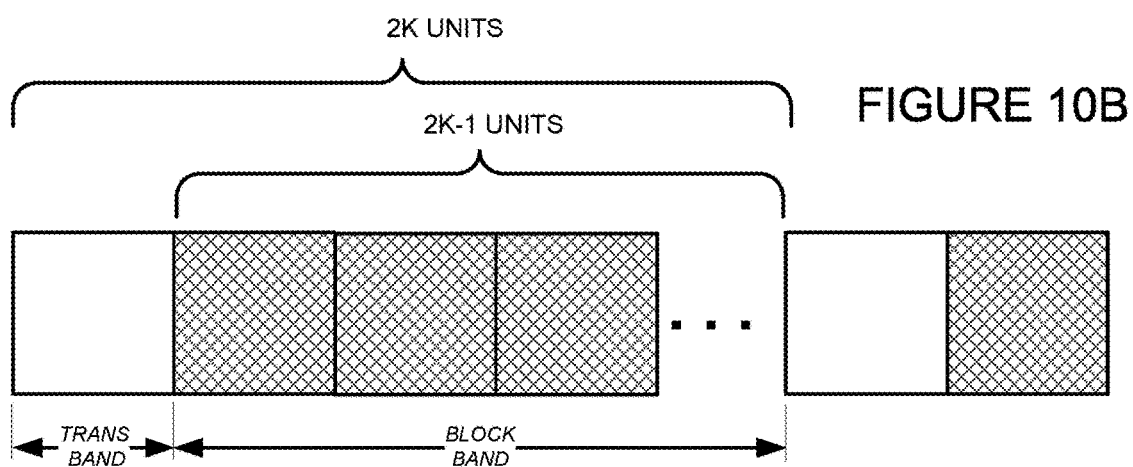
Figure 10C:
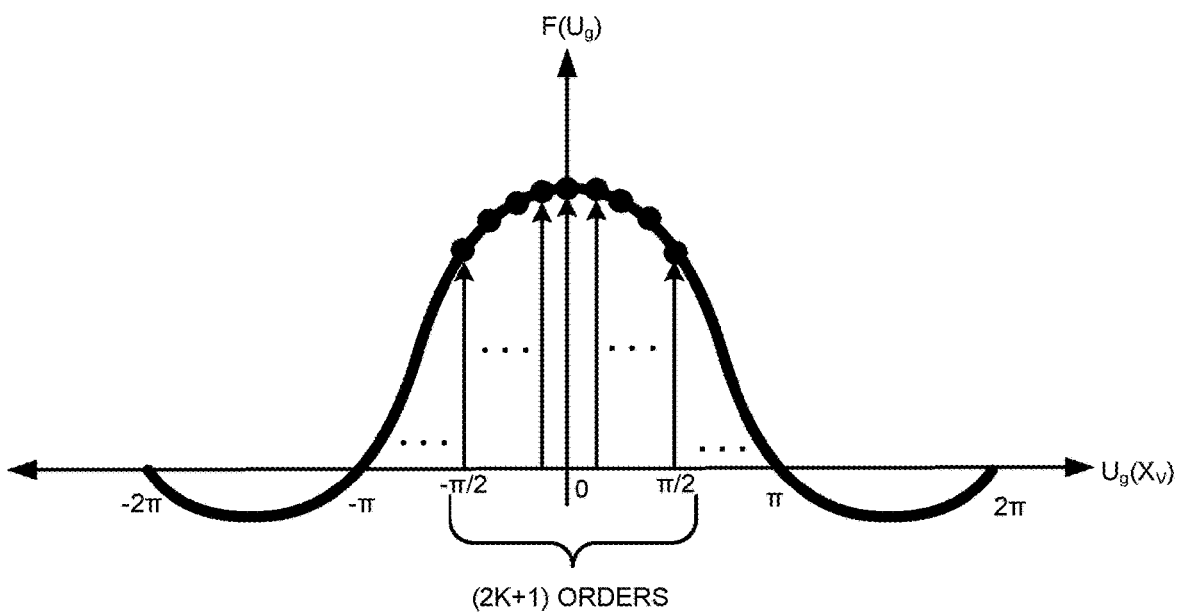

FIGS. 10A-10C illustrate an example of a square-wave amplitude-absorptive grating in which FIG. 10A illustrates a grating space transmission pattern, FIG. 10B illustrates a pixel space (half-tone dots) implementation and FIG. 10C illustrates a far-field diffraction power distribution.

Figure 11A:
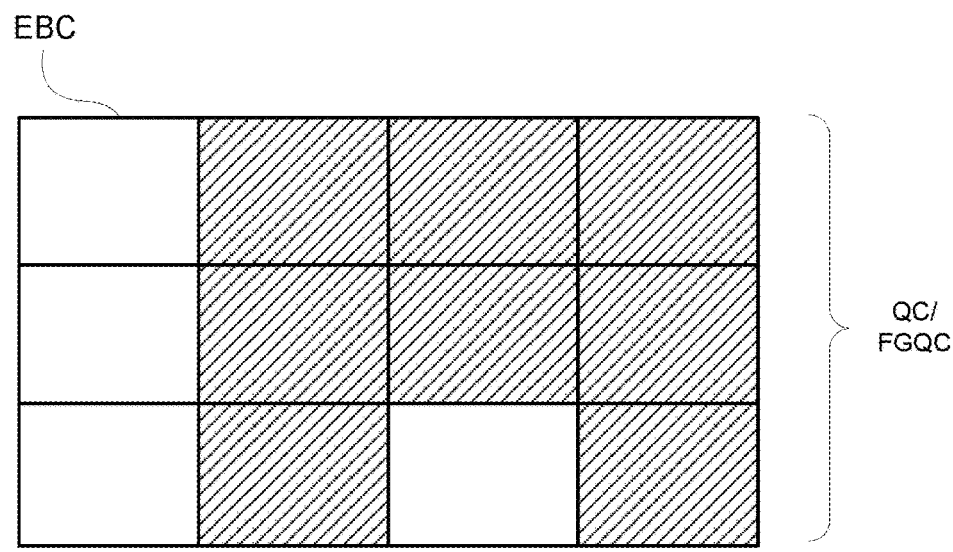
Figure 11B:
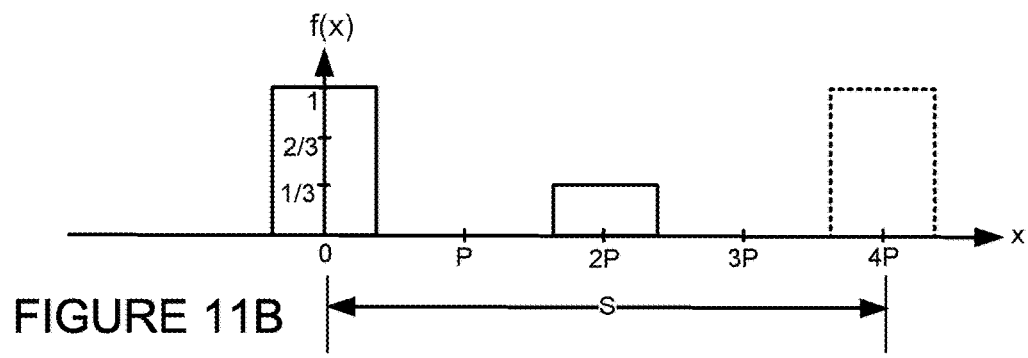
Figure 11C:
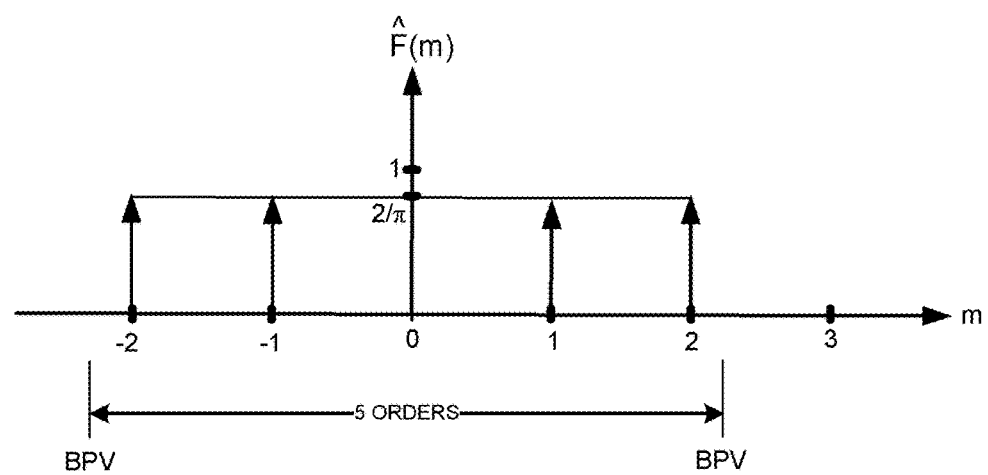

FIGS. 11A-C illustrates an example of fractional square-wave grating in which FIG. 11A illustrates a grating space transmission pattern, FIG. 11B illustrates a pixel space (half-tone dots) implementation and FIG. 11C illustrates a far-field diffraction power distribution.

Figure 12A:
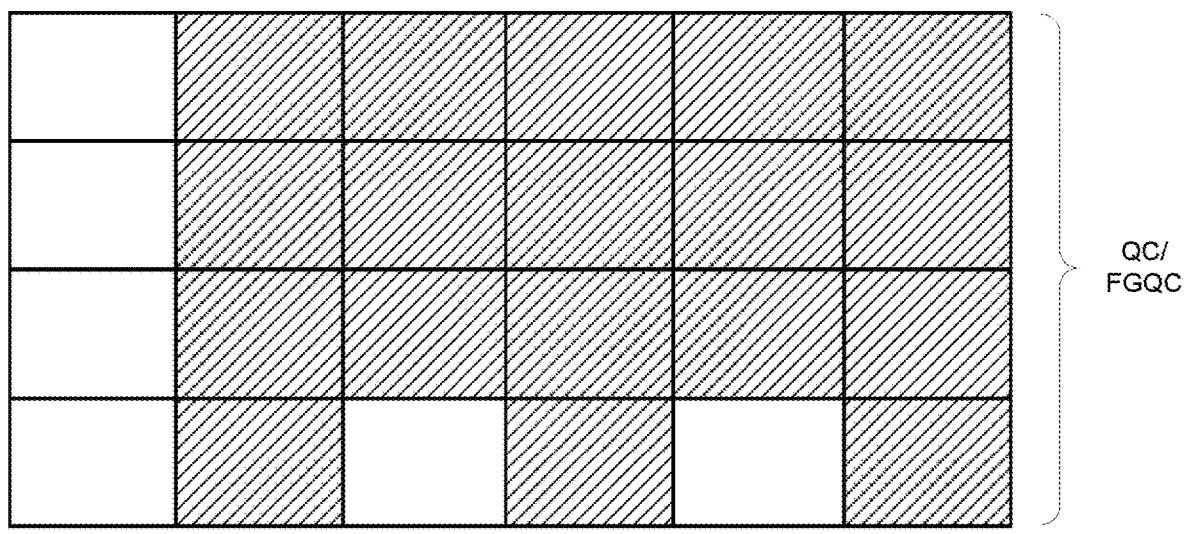
Figure 12B:
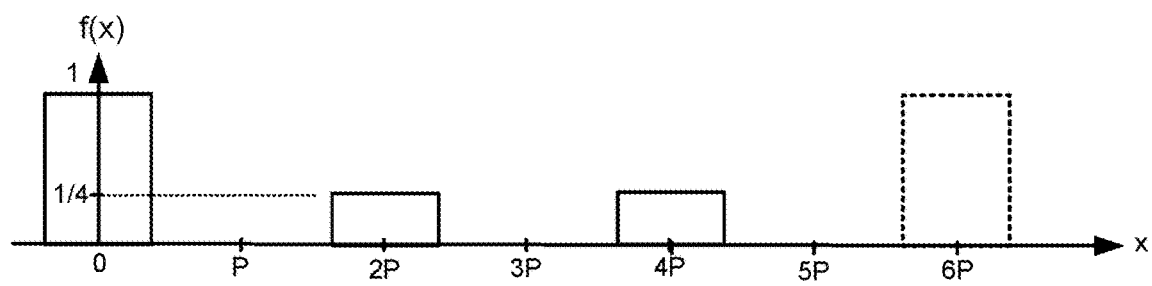
Figure 12C:
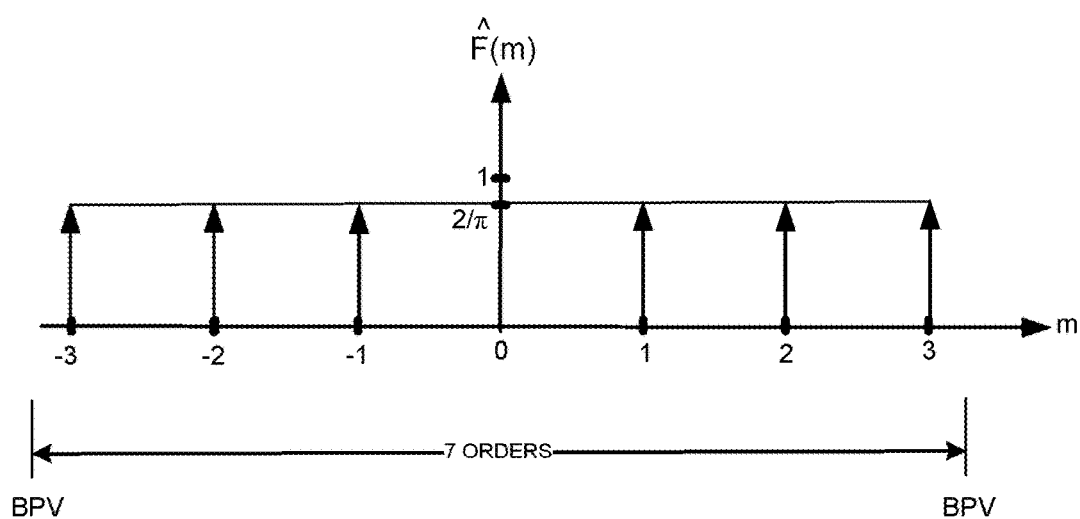

FIGS. 12A-C illustrates an example of fractional square-wave grating in which FIG. 12A illustrates a grating space transmission pattern, FIG. 12B illustrates a pixel space (half-tone dots) implementation and FIG. 12C illustrates a far-field diffraction power distribution.

FIGS. 13A-C illustrates an example of fractional square-wave grating in which FIG. 13A illustrates a grating space transmission pattern, FIG. 13B illustrates a pixel space (half-tone dots) implementation and FIG. 13C illustrates a far-field diffraction power distribution.

Figure 14A:
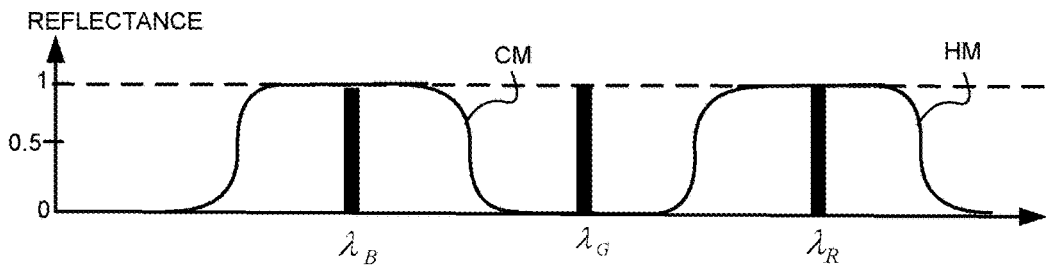
Figure 14B:
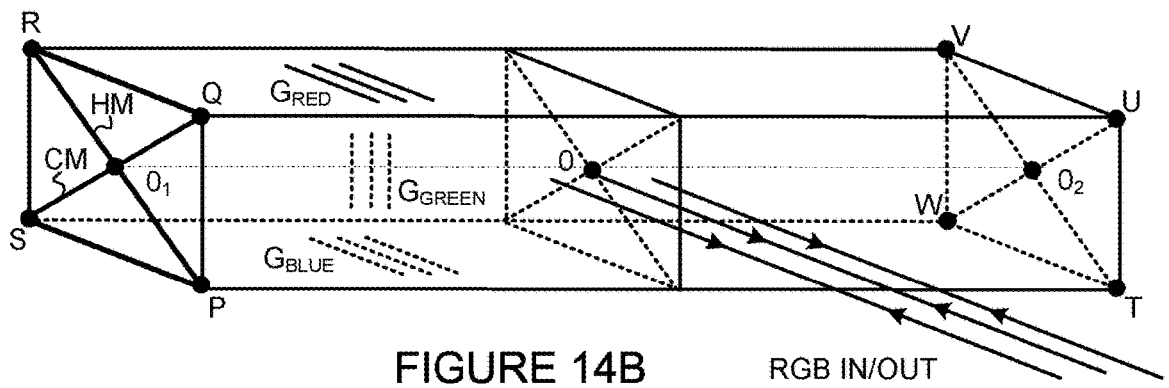
Figure 14C:
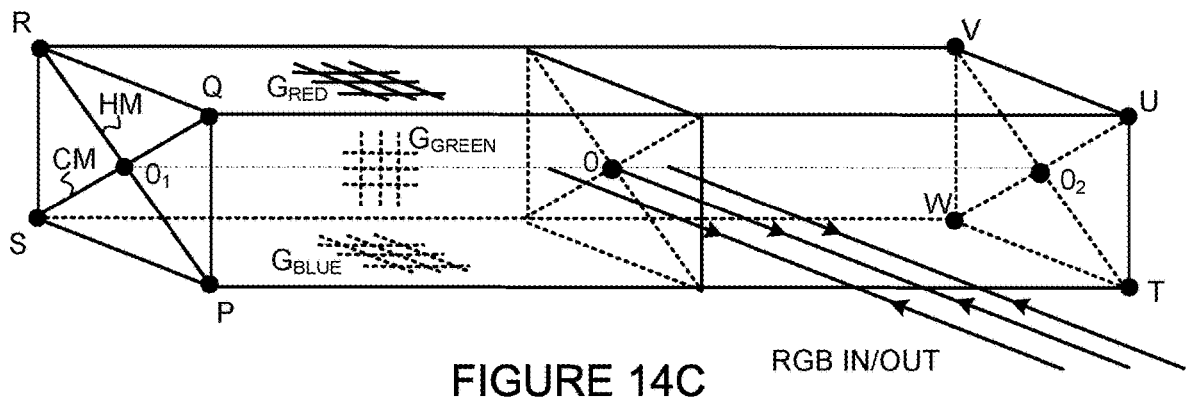

FIGS. 14A-14C illustrate an RGB—Orchestrated Grating Multiplexing Quadri-prism ("RGB-OGMQ") in which 14A illustrates spectral reflection characteristics of a HOT MIRROR (HM) and a COLD Mirror (CM) with reference to wavelengths of applied red, green and blue ("RGB") sourcing beams, FIG. 14B illustrates prism construction with R/G/B line gratings and FIG. 14C illustrates prism construction with R/G/B cross gratings.

Figure 15A:
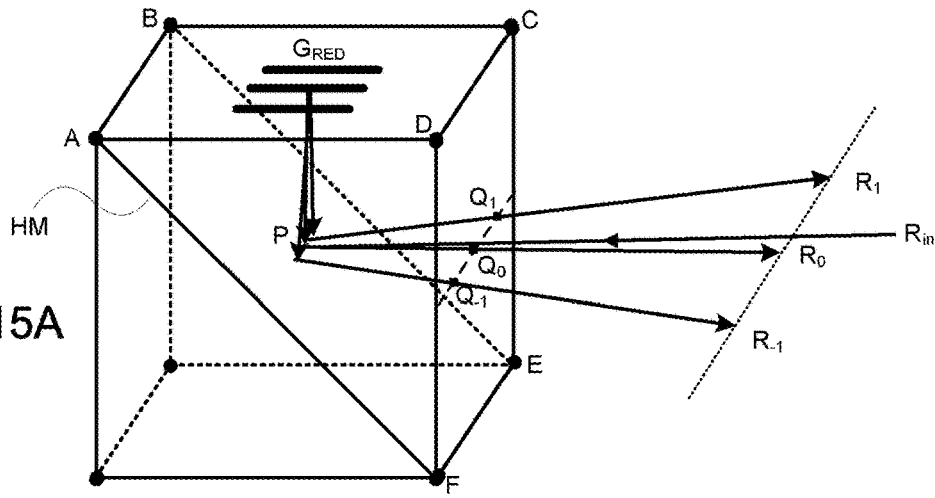
Figure 15B:
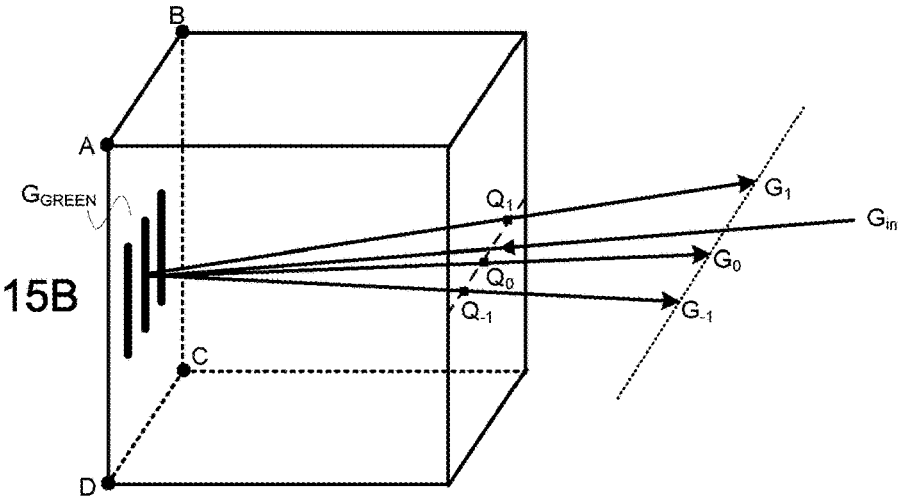
Figure 15C:
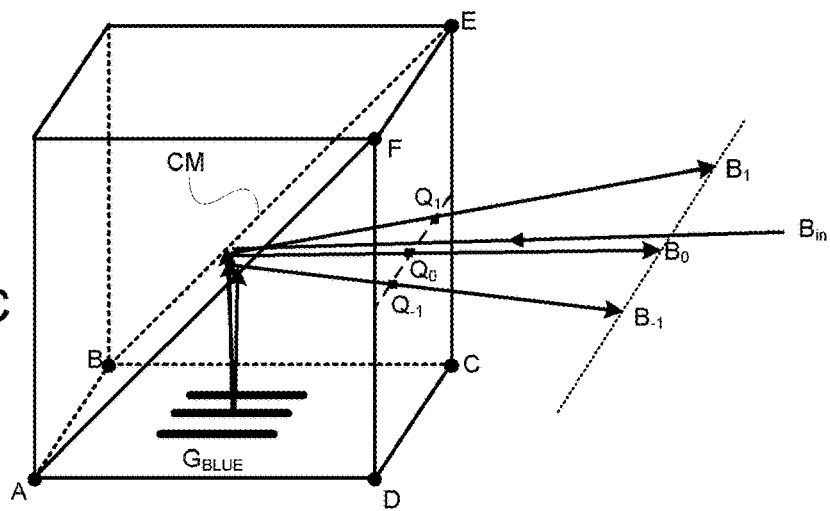

FIGS. 15A-15C illustrate an RGB-OGMQ having three sets of partitioned R/G/B-gratings built on 3-separated panels of a tri-color splitting prism, in which FIG. 15A illustrates RED beam modulation and reflection by RED grating panel, FIG. 15B illustrates GREEN beam modulation and reflection by GREEN grating panel, and FIG. 15C illustrates blue beam modulation and reflection by BLUE grating panel.

Figure 16A:
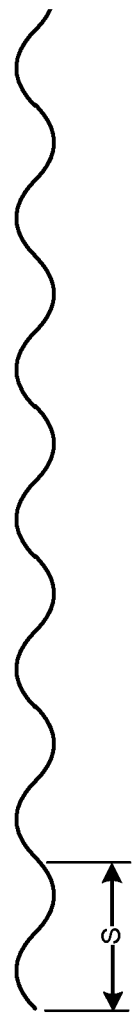
Figure 16B:
Figure 16C:
Figure 16D:
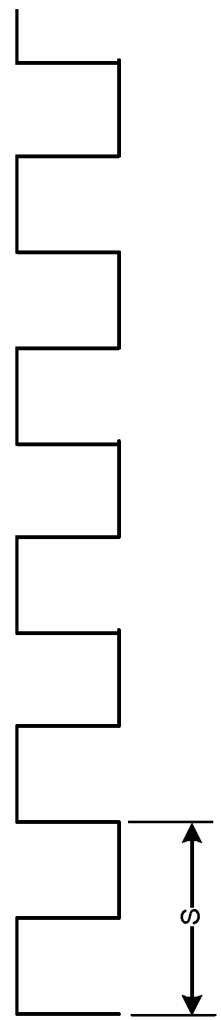
Figure 16E:
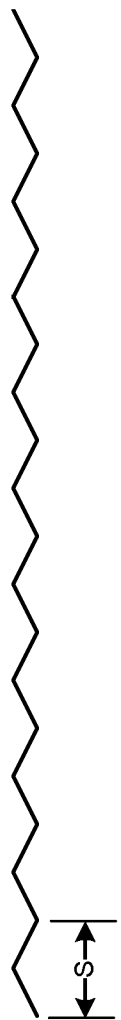

FIGS. 16A-16E illustrate reflective phase grating examples in which FIG. 16A illustrates a phase grating having a sinusoidal cross-sectional profile, FIG. 16B illustrates a phase grating having a cylindrical concave cross-sectional profile, FIG. 16C illustrates a phase grating having a cylindrical convex cross-sectional profile, FIG. 16D illustrates a phase grating having a square cross-sectional profile, and FIG. 16E illustrates a phase grating having a triangular cross-sectional profile.

Figure 17A:
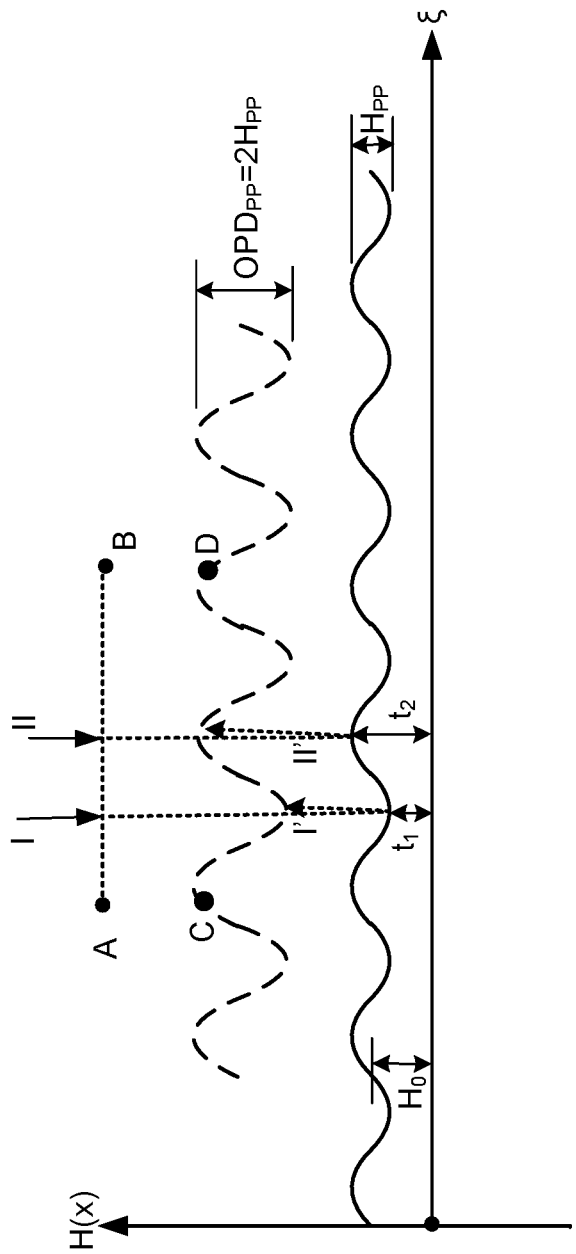
Figure 17B:
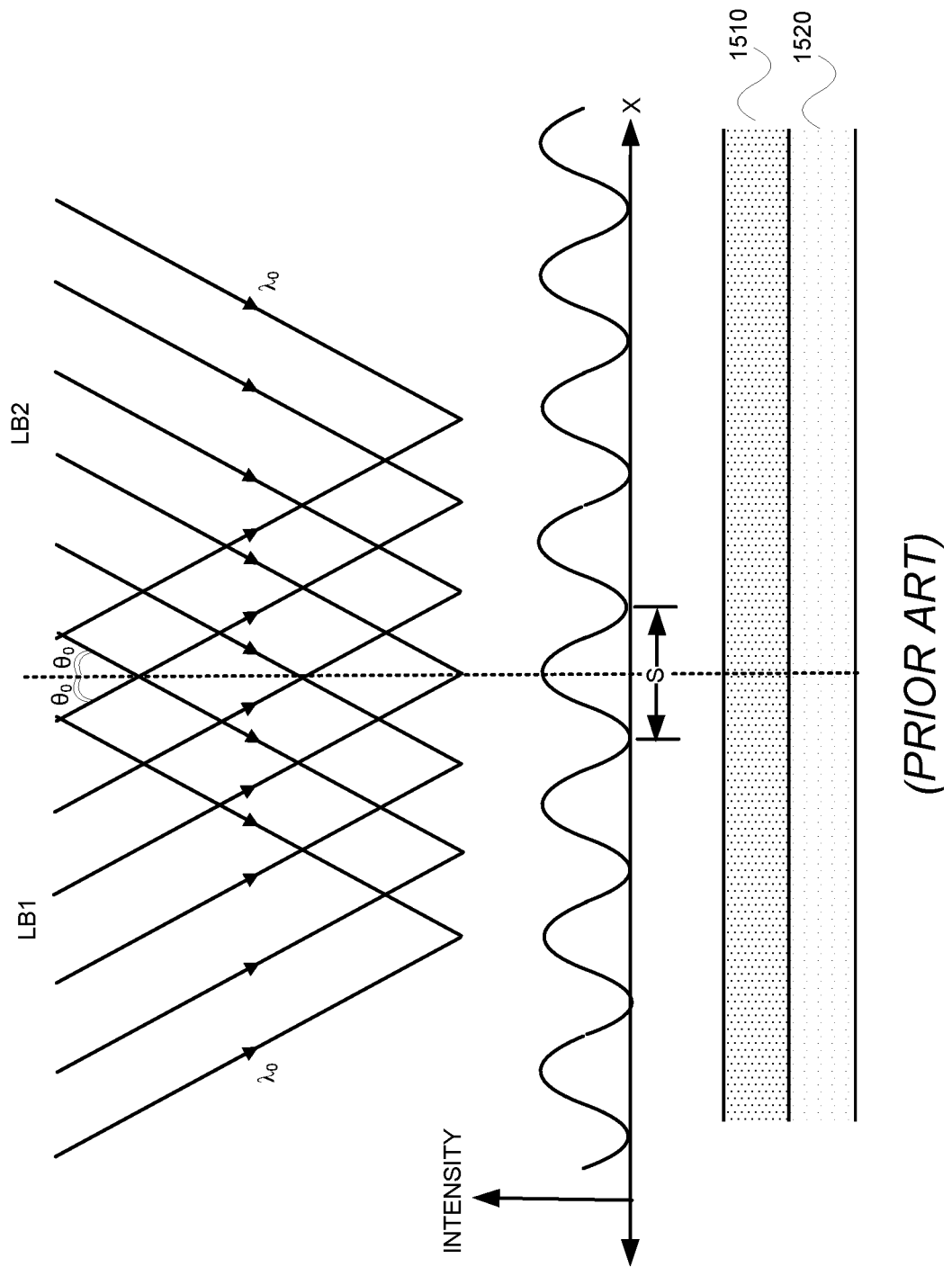

FIG. 17A illustrates a phase modulation of a uniform wave front (single wavelength beam having ideally flat wave-front) by a sinusoidal reflection phase-grating panel, and FIG. 17B illustrates a conventional technique for fabricating a sinusoidal phase-grating reflection panel via coherent interference between 2-collimated laser beams and photo-lithographic processing.

Figure 18A:
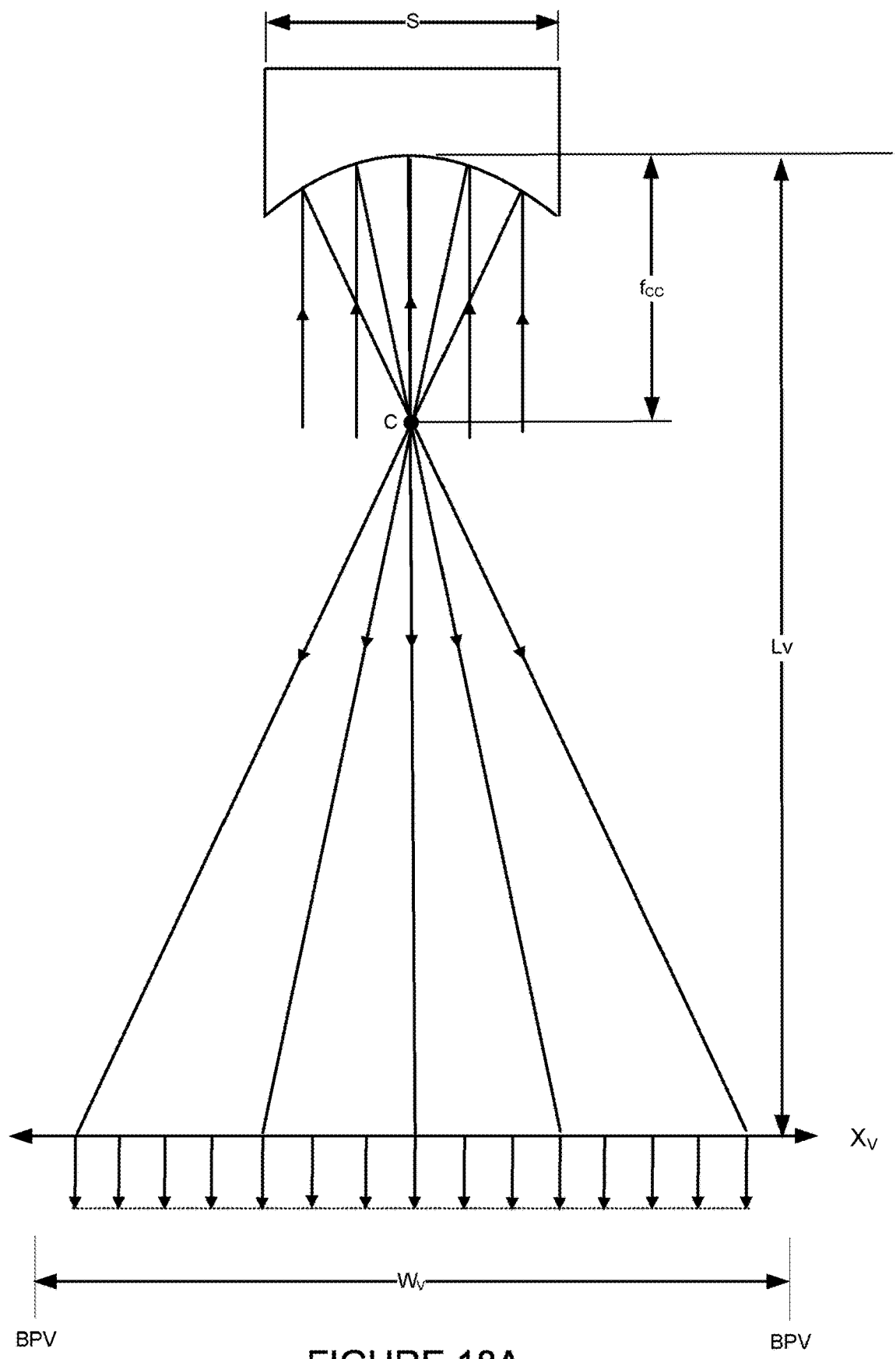
Figure 18B:
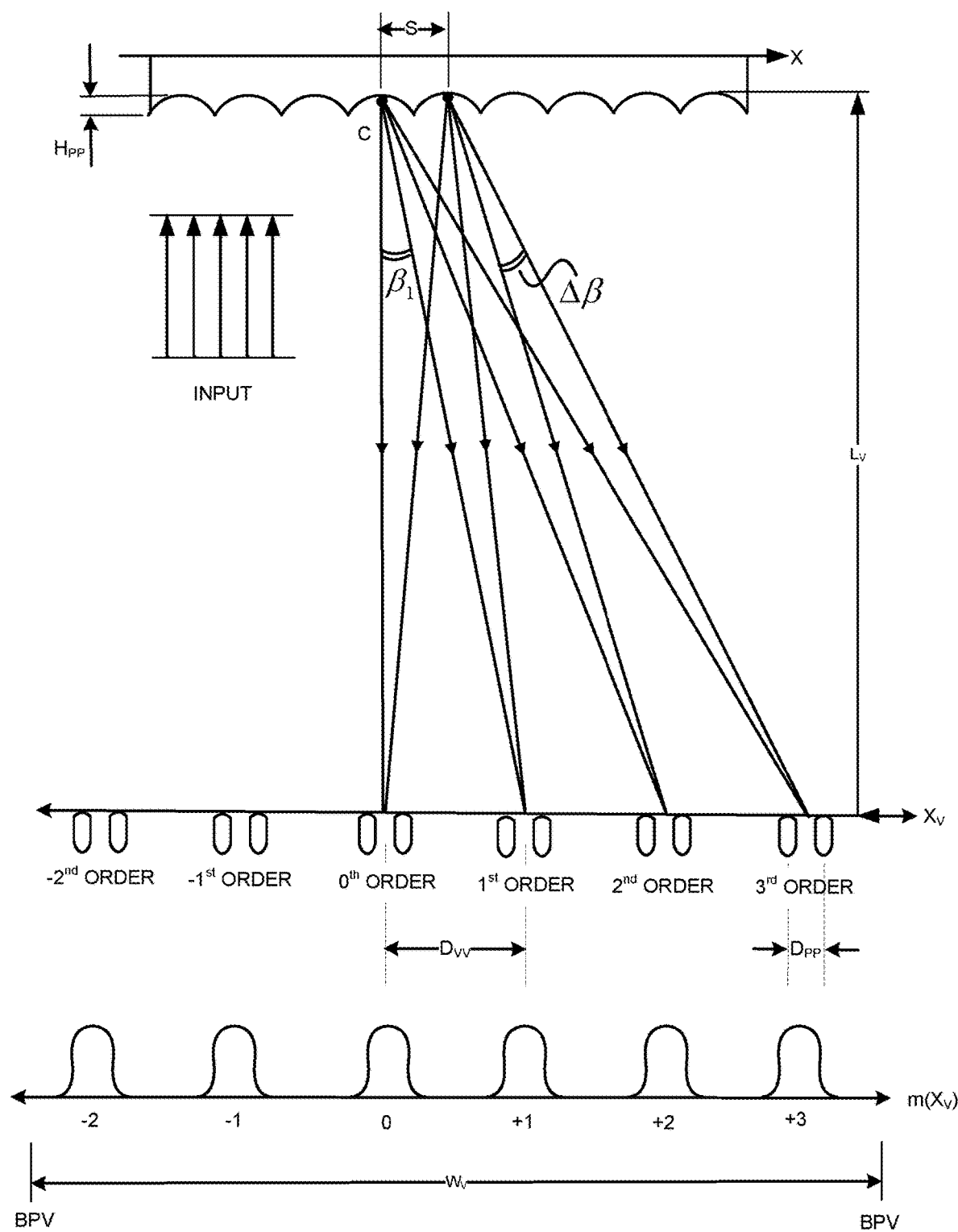

FIGS. 18A and 18B illustrate the modulation of a uniform wave front (Single wavelength beam having flat wave-front) by a concave or convex cylindrical reflective phase grating in which FIG. 18A illustrates modulation of uniform wave front by a singlet concave cylindrical reflector, and FIG. 18B illustrates modulation of uniform wave front by multiple concave cylindrical mini-reflectors, i.e. reflective phase grating.

Figure 19:
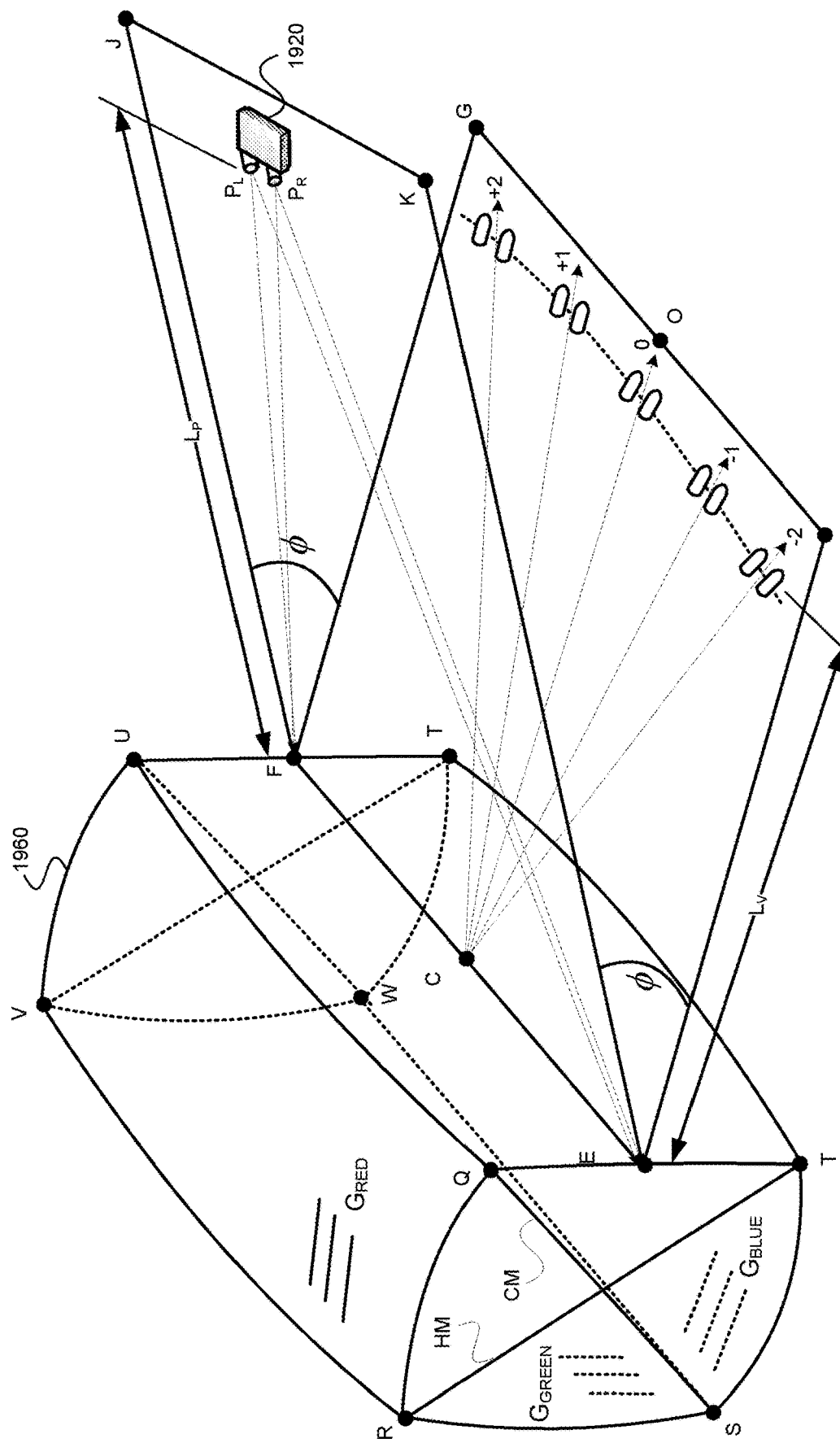

FIG. 19 illustrates a 3D Display System utilizing an RGB-OGMQ in which three gratings (R/G/B) are provided on inner surfaces of three separate concave panels.

Figure 20A:
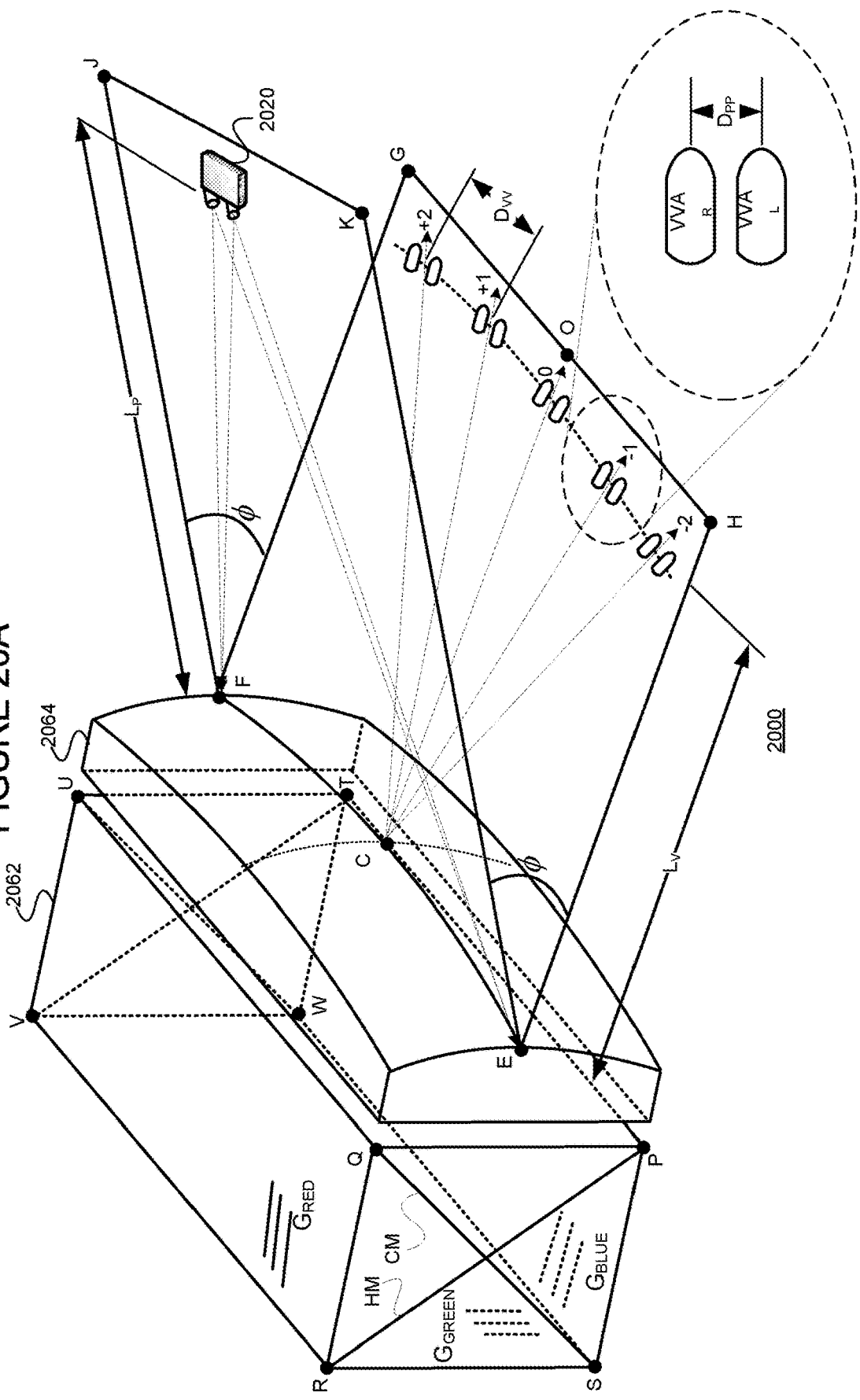
Figure 20B:
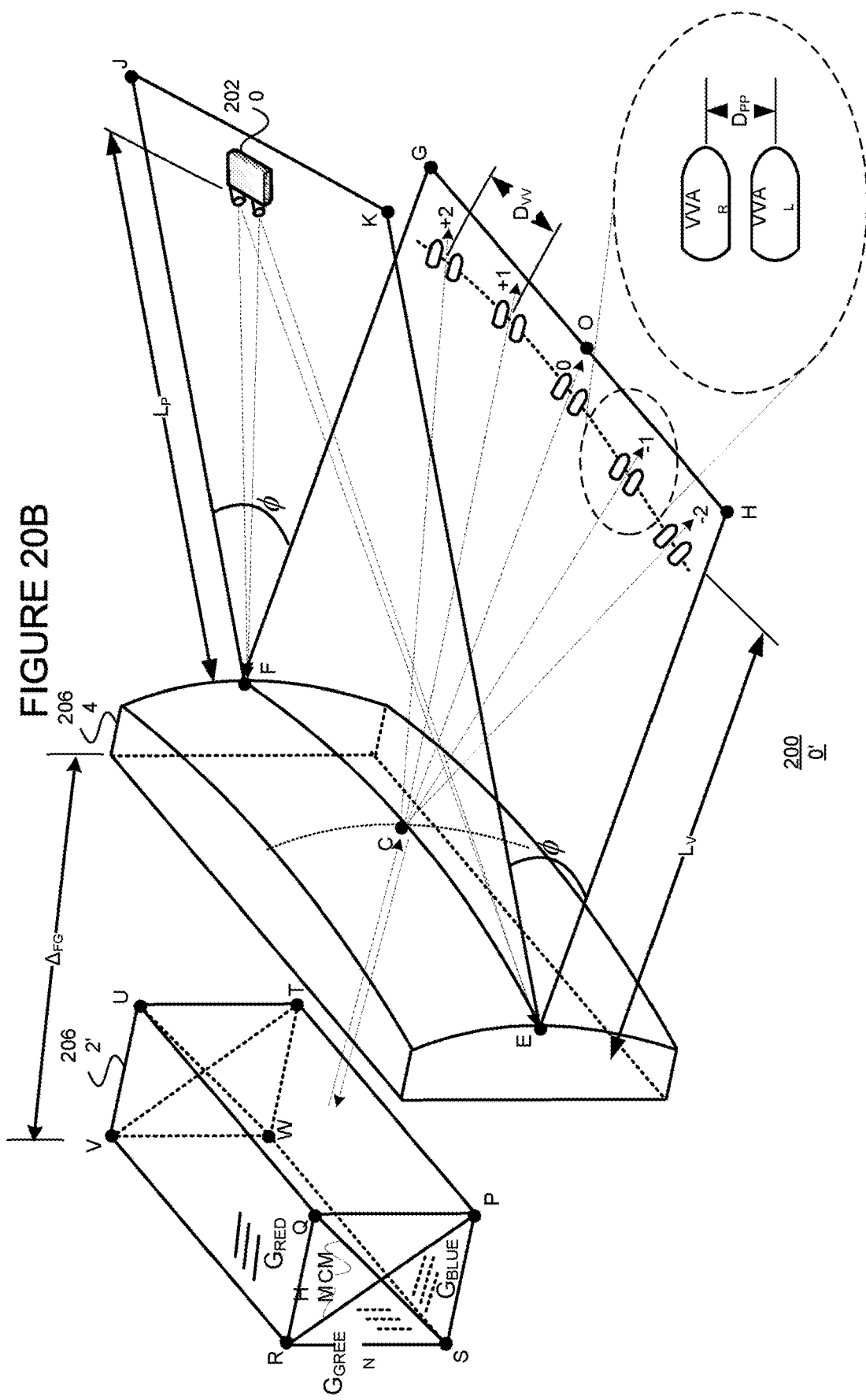

FIG. 20A illustrates a 3D Display System applying an RGB-OGMQ in which three gratings (R/G/B) are provided on three separate flat panels, and a convex lens is arranged at a front face of multiplexing prism, while FIG. 20B illustrates a similar system in which a (larger) gap is provided between the prism and the convex lens to permit a smaller multiplexing quadri-prism to be used.

Figure 21:
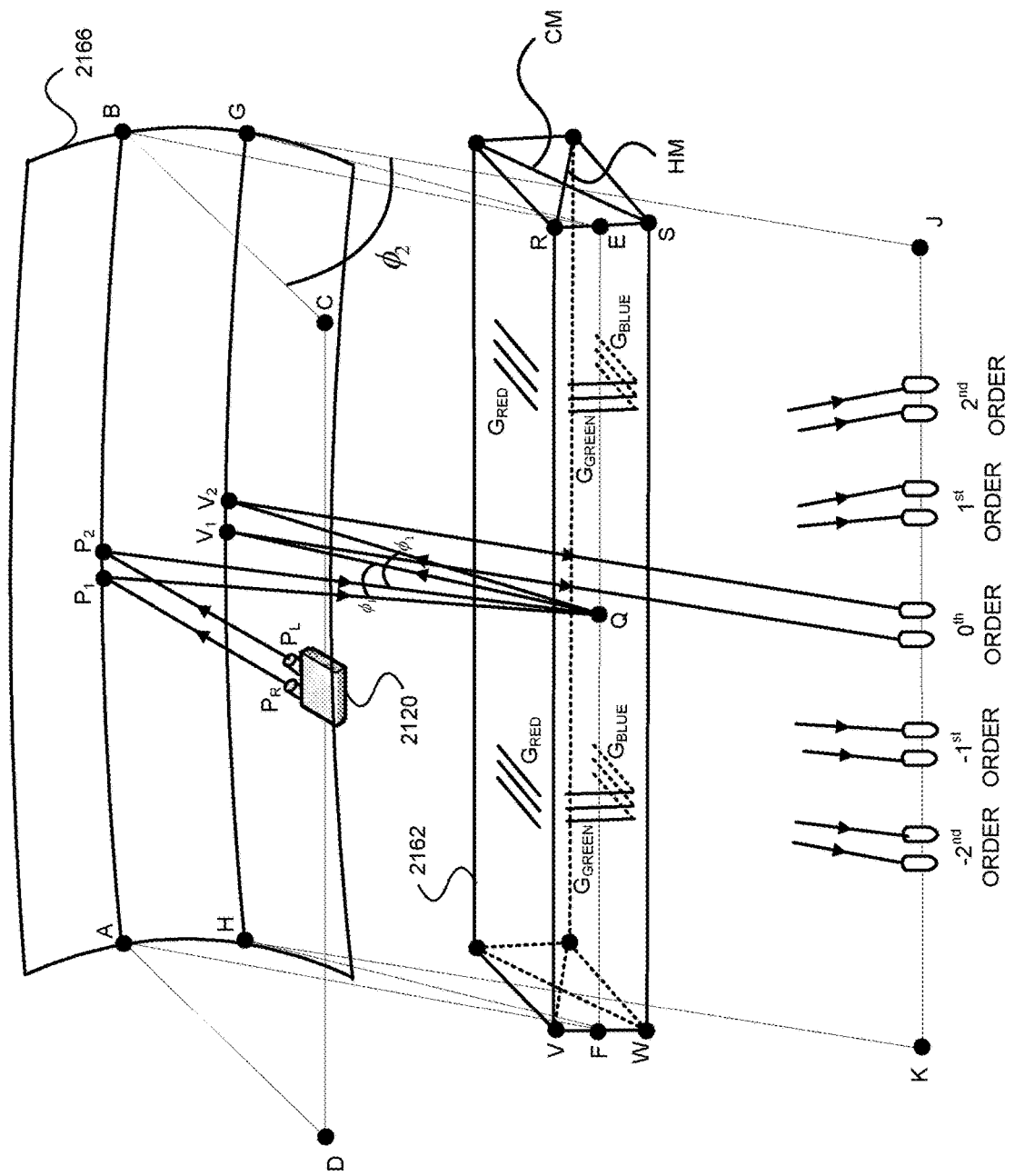

FIG. 21 is a general perspective view of a triple-folded optical system using one/shared large concave mirror panel which also illustrates a projector pair, and multiplexed VVA pairs.

Figure 22:
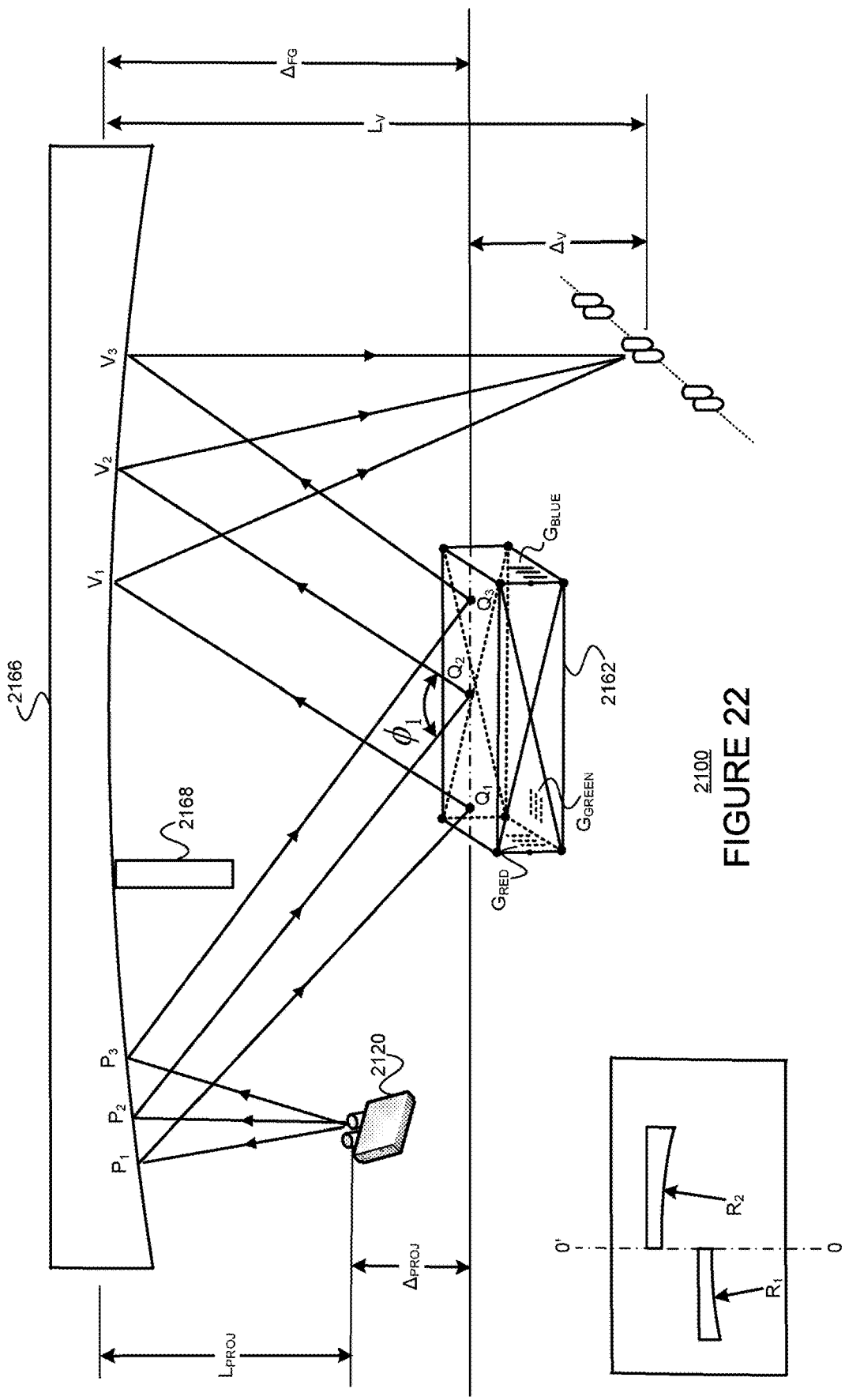

FIG. 22 illustrates a side-projection view of the triple-folded optical system of FIG. 21.

Figure 23:
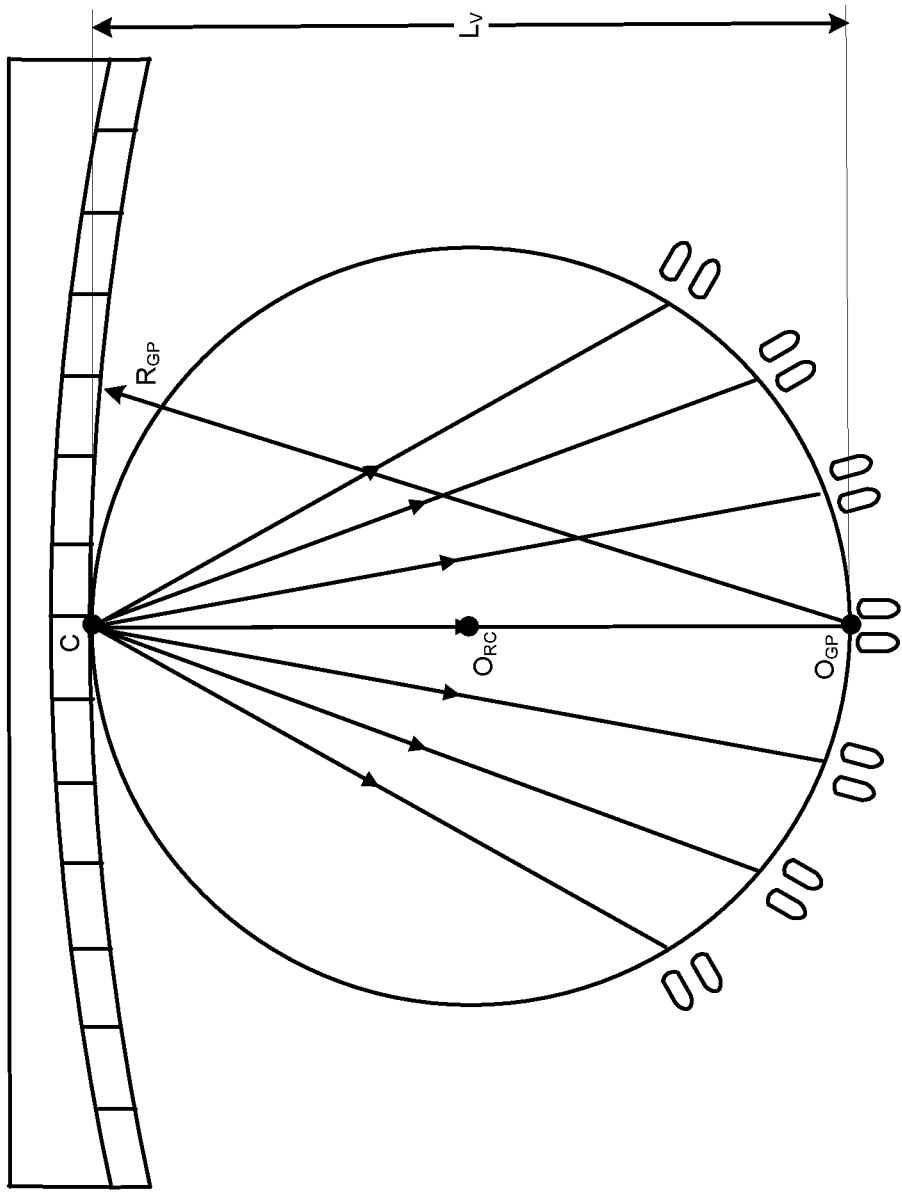

FIG. 23 illustrates a Rowland-circled configuration of viewers' spaces.

FIGS. 24A-24F illustrates various size, shape and blurring effects of a VVA pair.

Figure 25A:
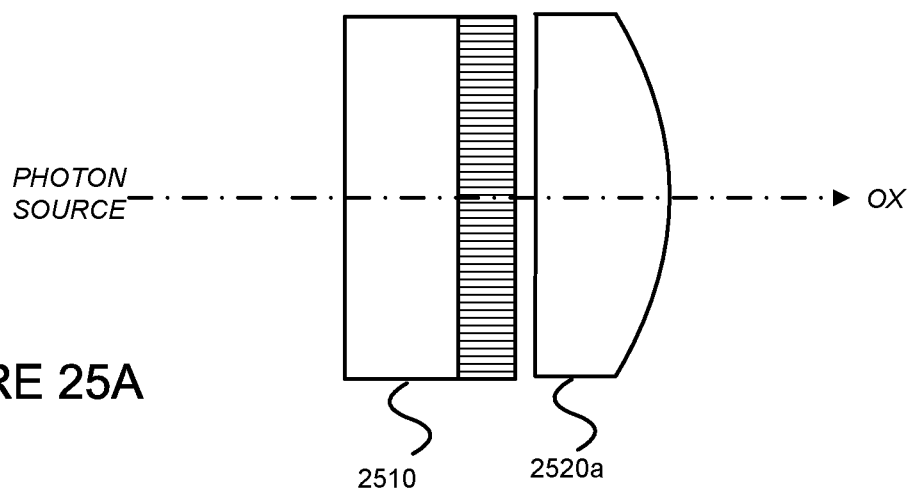
Figure 25B:
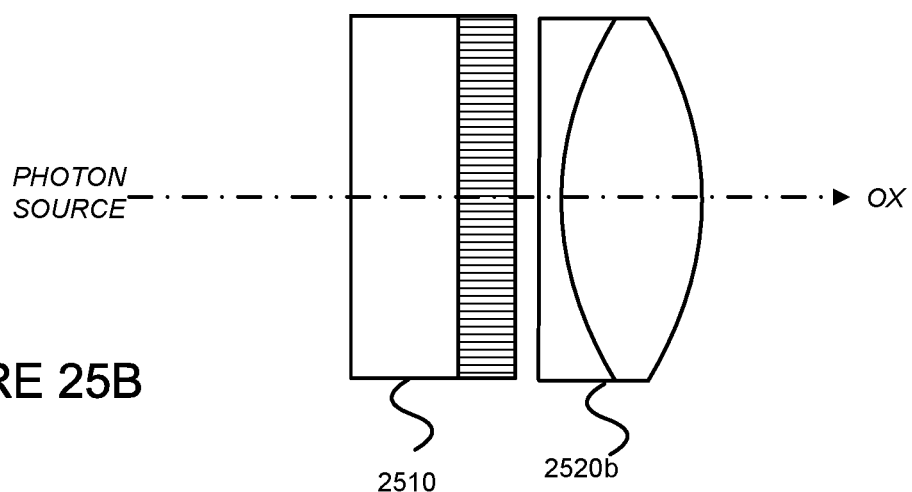
Figure 25C:
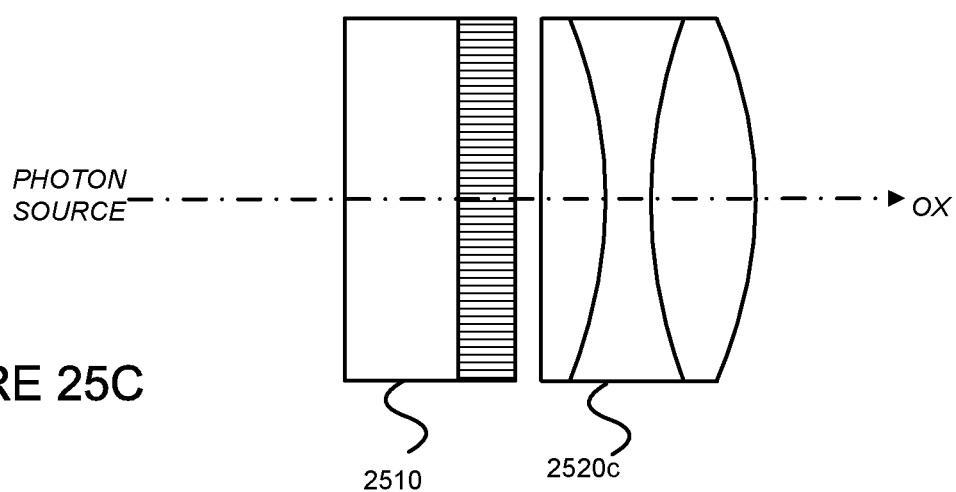

FIGS. 25A-25C illustrate a flat multiplexing display panel incorporating front-side focusing means via a convex singlet lens, an achromatic duplex lens, or an achromatic triplex lens, which may be used in the example systems illustrated in FIGS. 2, 4, 20A and 20B.

Figure 26:
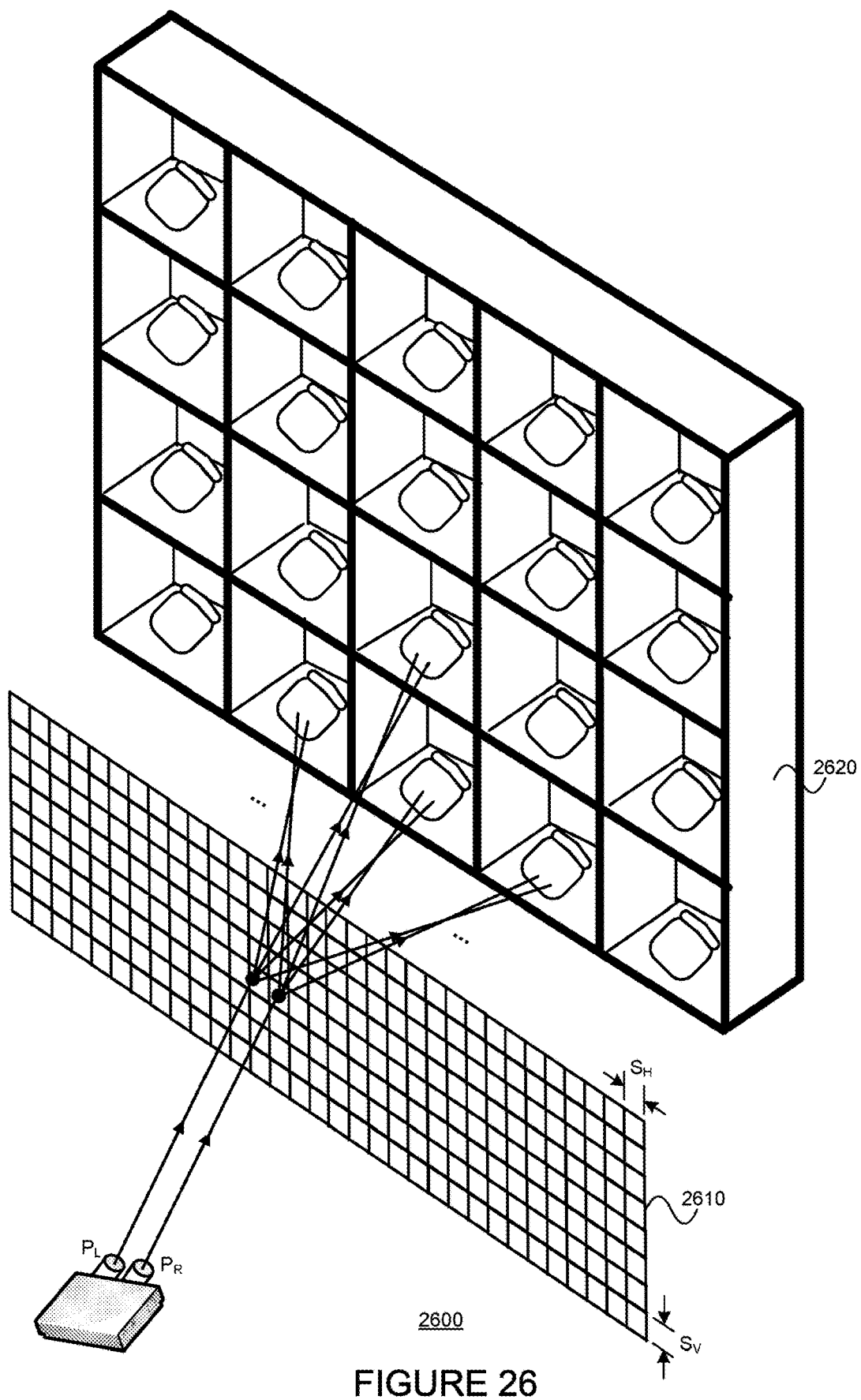

FIG. 26 illustrates the use of 2D Crossed Gratings for Multiplexing a VVA Pair into a 2D Array of VVA Pairs.

§ 5. DETAILED DESCRIPTION

The present invention may involve novel methods, apparatus, message formats, and/or data structures for providing a glass-free 3D panel display. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 5.1 Example Trichromatic Orchestrated Grating Multiplexing Apparatus ("T-OGMA") for Auto-Stereoscopic 3D Display to Multiple Simultaneous Viewers Generally, example embodiments consistent with the present invention concern a projection 3D display system for providing glass-free, three dimensional (3D) display to a plurality of viewing volumetric pairs in space corresponding to a hypothetical plurality of viewers' eye aperture pairs. Generally, such a system includes (1) a projector, (2) means for focusing both a left projection aperture and a right projection aperture of the dual-image projector to a distant viewing field, to create a left virtual volumetric aperture and a right virtual volumetric aperture ($VVA_L$ and $VVA_R$) with specified cross-sectional sizes of both $VVA_L$ and $VVA_R$, and a specified left-to-right separation ($D_{pp}$) between $VVA_L$ and $VVA_R$, and (3) means for providing tri-chromatic orchestrated (that is, coordinated) grating multiplexing. In the following, section 5.1.1 describes example CMY-OGMSS systems, while section 5.1.2 describes example RGB-OGMQ systems.

§ 5.1.1 Example CMY-Orchestrated Grating Multiplexing Sandwich Screen ("CMY-OGMSS") Systems In this section, example CMY-OGMSS systems are described with reference to FIGS. 1-4, while example CMY-amplitude gratings (and techniques to produce them) are described in section 5.1.1.1 with reference to FIGS. 5-16B. More specifically, in FIGS. 1-4, the tri-chromatic orchestrated grating multiplexing apparatus ("T-OGMA") is a CMY-OGMSS. These example CMY-OGMSS systems may include three (3) layers of amplitude-modulated absorption gratings, each layer made of cyan, magenta and yellow (CMY) colored gratings respectively. (Note that although phase gratings may be used instead, using amplitude gratings simplifies manufacturing of the OGMSS.) The cyan, magenta and yellow grating lines may be arranged parallel with respect to each other, and the grating layers are constructed (one on top of another directly or with interim adhesive layers between them) in a sandwich-style. The pitch values of the corresponding cyan, magenta and yellow gratings are mutually-orchestrated designed according to Equations (1) and (2), provided below.

Figure 1:
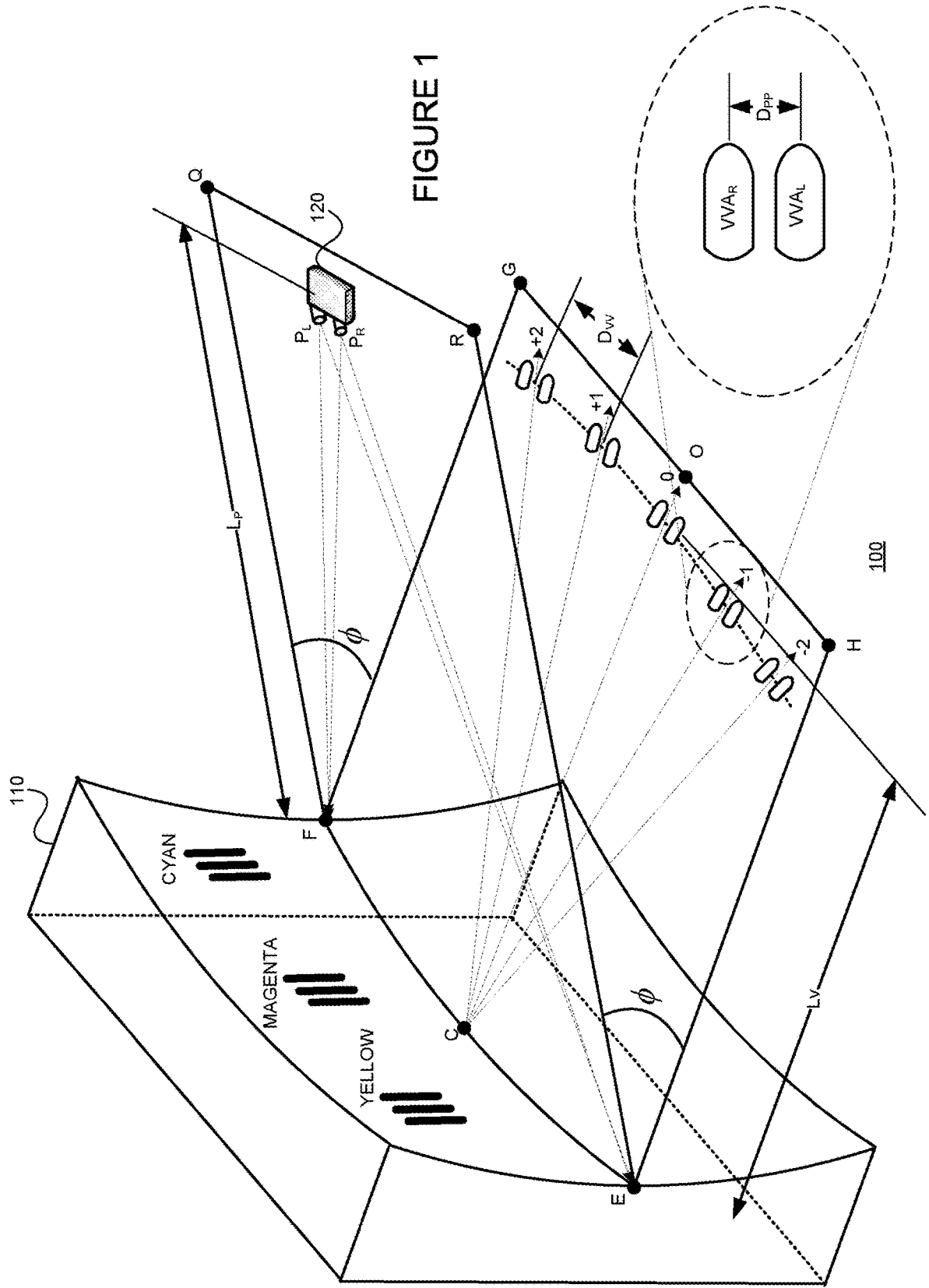
FIG. 1 illustrates a glass-free 3D Display System as a first example CMY-Orchestrated Grating Multiplexing Sandwich Screen ("CMY-OGMSS") system, which uses a single concave reflection panel, front projection, arrangement.

FIG. 1 illustrates a glass-free 3D Display System 100 as a first example CMY-Orchestrated Grating Multiplexing Sandwich Screen ("CMY-OGMSS") system, which uses a single concave panel 110, front projection, arrangement. Although the front reflecting surface of panel 110 can preferably be made concave parabolic (for improved optical performance), in practice, it can be fabricated concave spherical for reduced manufacturing costs. The system 100 also includes a projector 120 producing left and right projections ($P_L$ and $P_R$), which is separated from the panel 110 by a distance of L. That is, in the example system of FIG. 1, the focusing panel device is a concave spherical/parabolic panel reflector 110 and the gratings sandwich screen is built onto front surface of the concave spherical/parabolic panel reflector 110. The concave spherical/parabolic panel reflector 110 receives the left and right projections of the projector 120 and reflects them to left and right virtual volumetric apertures ($VVA_L$ and $VVA_R$), each separated by pupil-to-pupil distance ($D_{PP}$), located at a distance $L_V$ from the panel 110. The lateral distance in the VVA-space between two adjacent viewers is referred to as viewer-to-viewer distance ($D_{vv}$). In the example system 100 of FIG. 1, the projection plane QREF is provided at an angle φ relative to reflection plane GHEF, whereas angle φ is maintained as small as possible (e.g., 0 to 20 degrees). Note that for illustration purpose, angle φ is intentionally exaggerated in FIG. 1 (as well as in FIGS. 2-3, 19-20, to follow).

Figure 2:
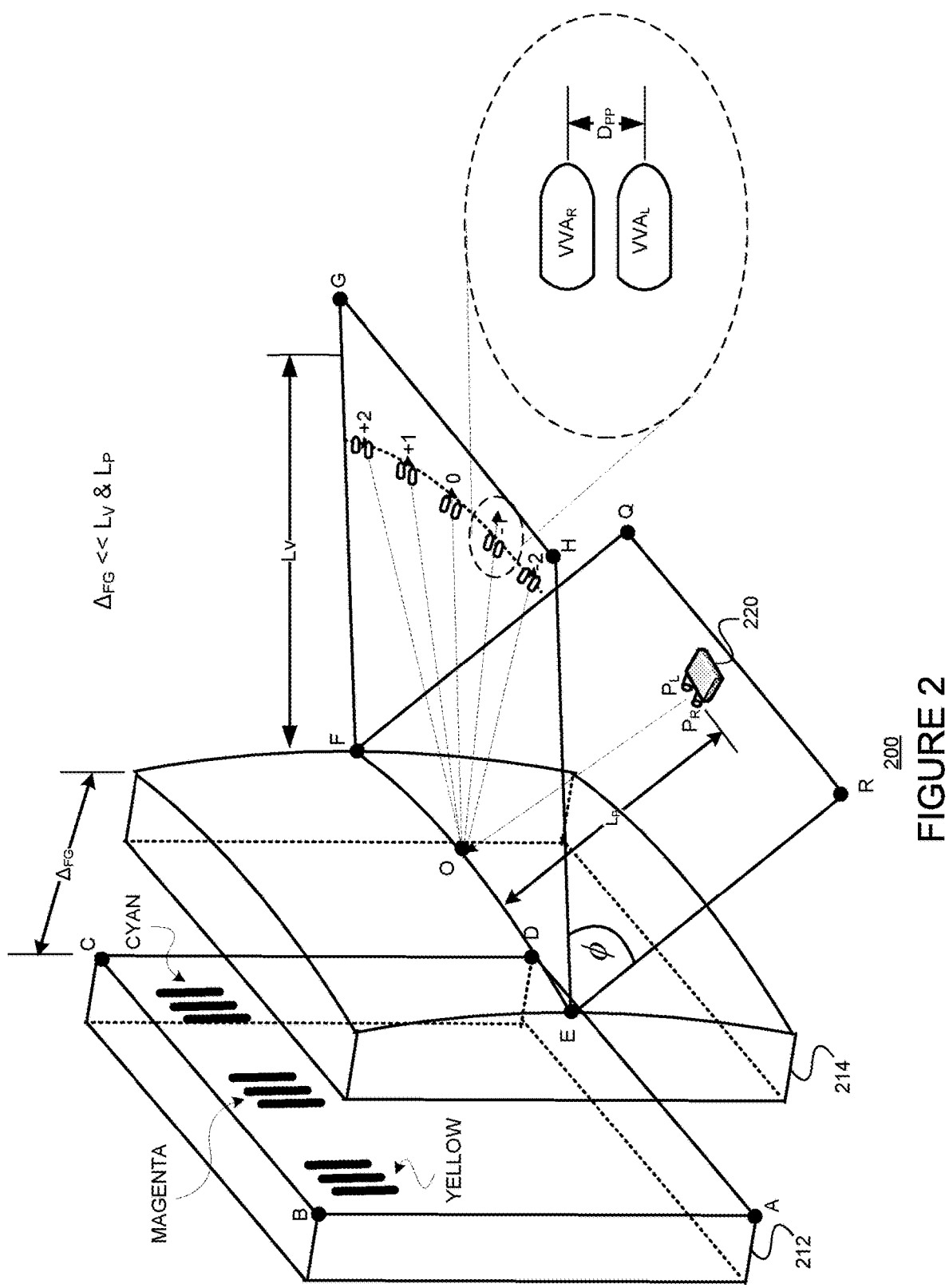
FIG. 2 illustrates a second example CMY-OGMSS system, which uses a flat reflection panel proceeded with convex lens, front projection arrangement.

FIG. 2 illustrates a second example CMY-OGMSS system 200, which uses a flat reflection panel 212 proceeded with convex lens 214, front projection arrangement. The system 200 also includes a projector 220 producing left and right projections ($P_L$ and $P_R$), which is separated from the convex lens by a distance of $L_P$. That is, in the example system of FIG. 2, the focusing panel device includes both (1) a flat panel reflector 212 and (2) a convex lens 214. The flat panel reflector 212 is provided with a gratings sandwich screen. The flat panel reflector 212 receives, via the convex lens 214, the left and right projections of the projector 220 and reflects them, via the convex lens 214, to left and right virtual volumetric apertures ($VVA_L$ and $VVA_R$), each separated by pupil-to-pupil distance ($D_{PP}$), located at a distance $L_V$ from the convex lens 214. In the example system 200 of FIG. 2, the projection plane QREF is provided at an angle 4) to reflection plane GHEF. Thus, in the system of FIG. 2, the focusing panel device is composed of a transparent convex lens 214 permitting double-path of projection input and viewing output beams, and the CMY-Orchestrated Grating Multiplexing Sandwich Screen is attached onto front surface of a flat reflecting panel 212.

Figure 3:
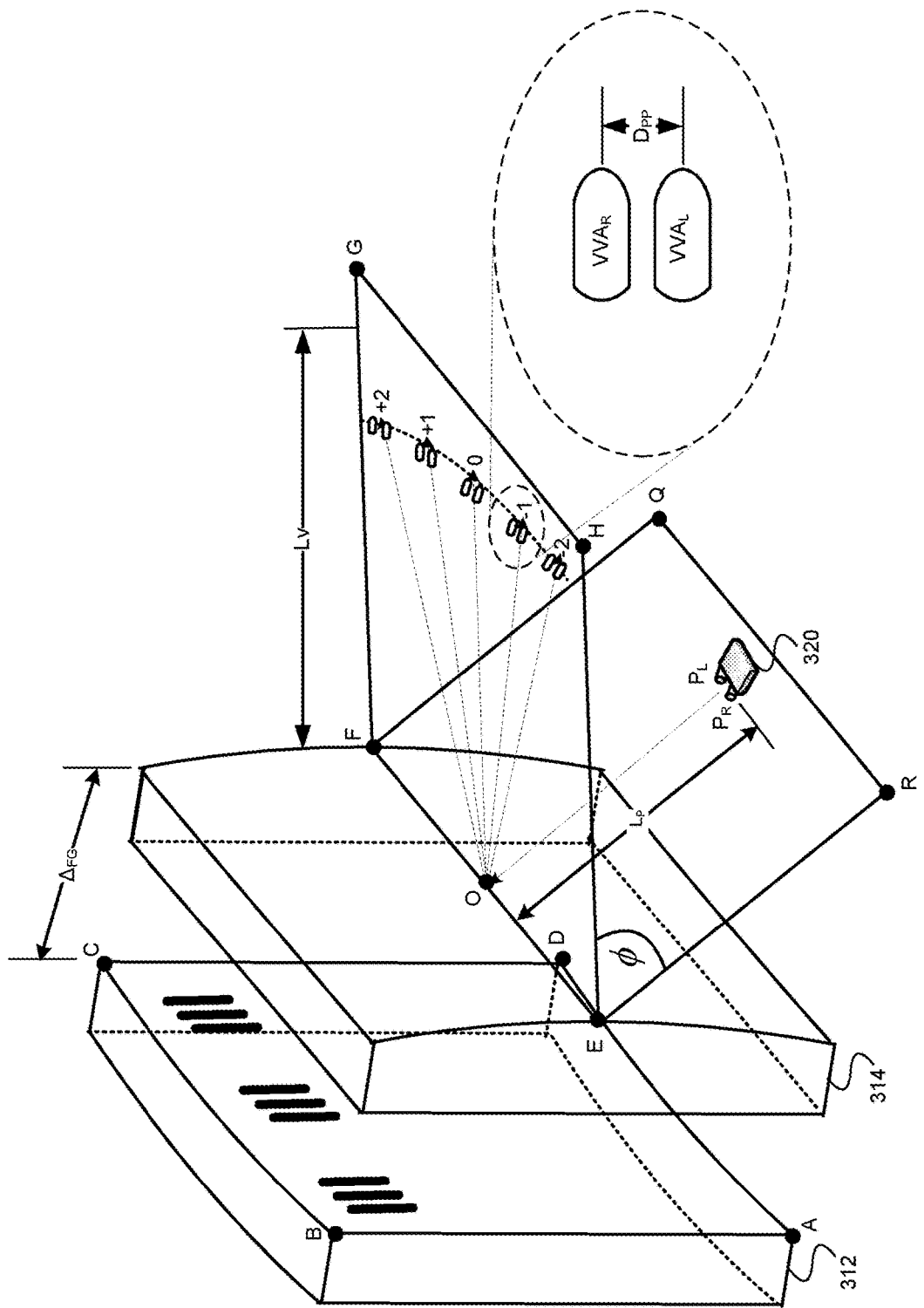
FIG. 3 illustrates a third example CMY-OGMSS system, which uses a front face of concave cylindrical reflection panel having an axis along a vertical direction, and proceeded in its front with a convex cylindrical lens having axis along horizontal direction, front projection arrangement.

FIG. 3 illustrates a third example CMY-OGMSS system 300, which uses a front face of reflective concave cylindrical panel 312 having an axis along a vertical direction, and proceeded in its front with convex cylindrical lens 314 having axis along horizontal direction, front projection arrangement. The system 300 also includes a projector 320 producing left and right projections ($P_L$ and $P_R$), which is separated from the convex cylindrical lens 314 by a distance of $L_P$. That is, in the example system of FIG. 3, the focusing panel device includes both (1) a concave cylindrical panel reflector 312 and (2) a convex cylindrical lens 314. The concave cylindrical panel reflector 312 is provided with a gratings sandwich screen. The concave cylindrical panel reflector 312 receives, via the convex cylindrical lens 314, the left and right projections of the projector 320 and reflects them, via the convex cylindrical lens 314, to left and right virtual volumetric apertures ($VVA_L$ and $VVA_R$), each separated by pupil-to-pupil distance ($D_{PP}$), located at a distance $L_V$ from the convex cylindrical lens 314. In the example system 300 of FIG. 3, the projection plane QREF is provided at an angle $\phi$ to reflection plane GHEF. Thus, in the system of FIG. 2, the focusing panel device is composed of (i) a concave cylindrical reflective base panel 312, having its axis of symmetry in the vertical direction, and (ii) a transparent convex cylindrical lens 314, having its axis of symmetry in the horizontal direction and permitting double-path of input and output beams, and the CMY-OGMSS is attached onto front surface of the cylindrical reflecting concave panel 312.

Figure 4:
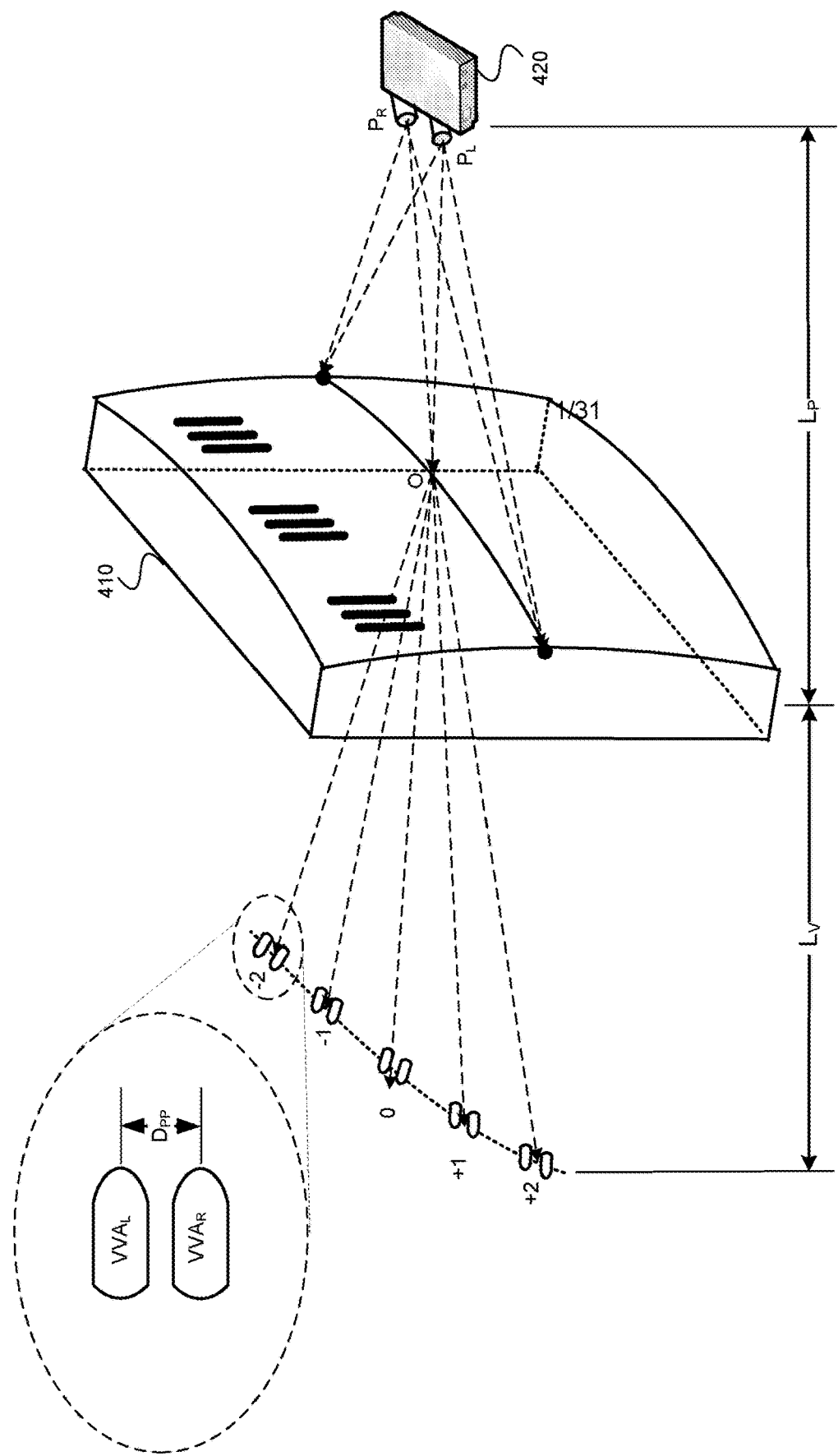
FIG. 4 illustrates a fourth example CMY-OGMSS system, which uses a transmission convex lens with attached CMY-OGMSS, back projection arrangement.

FIG. 4 illustrates a glass-free 3D Display System 400 as a fourth example CMY-OGMSS system, which uses a transparent convex lens 410, rear projection, arrangement. The system 400 also includes a projector 420 producing left and right projections ($P_L$ and $P_R$), which is separated from the panel 410 by a distance of $L_P$. The CMY-OGMSS is attached onto the transparent convex lens 410 at its front surface, or its rear surface, or is inserted at an internal plane of the transparent convex lens. The transparent convex lens 410 receives the left and right projections of the projector 420 and focuses and multiplexes them to left and right virtual volumetric apertures ($VVA_L$ and $VVA_R$), each separated by pupil-to-pupil distance ($D_{PP}$), located at a distance $L_V$ from the transparent convex lens 410. In the system 400 of FIG. 4, the transparent convex lens 410 permits a single-path of polychromatic beams from the dual-projector 440 to the VVAs.

In each of the example systems 100-400 of FIGS. 1-4, respectively, a CMY-OGMSS is provided on a reflective panel or a transparent lens. Example CMY-OGMSSs using absorptive amplitude gratings, including square-wave and fractional square-wave types, are now described in section 5.1.1.1 below.

§ 5.1.1.1 Example Gratings for CMY-OGMSSs

FIG. 5 illustrates a horizontal cross-sectional view of an example CMY-OGMSS system. Referring to FIG. 5, the CMY-OGMSS comprises three (3) layers of amplitude-modulated absorption gratings, each layer made of cyan, magenta and yellow colored (CMY) gratings respectively. As shown, the cyan, magenta and yellow grating lines are arranged in parallel with each other, and the grating layers are constructed one on top of another (for example, directly, or with some transparent intervening layer) in a sandwich-style, the pitch values of the corresponding cyan, magenta and yellow gratings are mutually-orchestrated designed according to Equations (1) and (2). More specifically, the pitch values of the three-colored diffraction gratings are so designed that the resulting center-to-center distance between two adjacent VVA pairs ($D_{vv}$) is larger or equal to twice the left-to-right separation ($D_{pp}$) between $VVA_L$ and $VVA_R$ of an VVA pair (i.e., $D_{vv} \geq 2D_{pp}$), and overlaps between different orders of VVA pairs are prevented.

In some example embodiments consistent with the present invention, the three-colored diffraction gratings are made of one-dimensional parallel line gratings, while in other example embodiments consistent with the present invention, the three-colored diffraction gratings are made of two-dimensional orthogonally-crossed gratings.

FIGS. 6A-6D illustrate a relationship between red/green/blue sourcing wavelengths and spectral absorbance of cyan/magenta/yellow grating layers, in which FIG. 6A illustrates power spectra/wavelengths of R/G/B sourcing colors. FIG. 6B illustrates absorbance spectrum of cyan grating layer, FIG. 6C illustrates absorbance spectrum of magenta grating layer, and FIG. 6D illustrates absorbance spectrum of yellow grating layer. As a theoretical model, we assume:

(1) for propagation of RED beams, the lights shall be solely modulated by a CYAN grating layer, while assuming magenta and yellow layers are 100% transparent;

(2) for GREEN beams, the lights are solely modulated by a MAGENTA grating layer, while assuming cyan and yellow layers are 100% transparent; and (3) for BLUE beams, the lights are solely modulated by a YELLOW grating layer, while assuming cyan and magenta layers are 100% transparent.

Hereafter, the theoretical model delineated in (1) (2) and (3) above will be referred to as "independent and un-overlapping" spectral absorbing properties for cyan/magenta/yellow ("CMY") sandwiched gratings.

In the following, square-wave amplitude gratings are described in section 5.1.1.1.1 with reference to FIGS. 7A-10C, and fractional square-wave amplitude gratings are described in section 5.1.1.1.2 with reference to FIGS. 11A-13C.

§ 5.1.1.1.1 Example Square-Wave Amplitude Gratings

FIG. 7A illustrates a relationship between a design value of grating space (S), viewer-to-grating distance ($L_V$), and a viewer-to-viewer lateral distance ($D_{VV}$) demonstrated via first order diffraction of a single-color grating. The input beam examples are along a direction normal to the grating. INPUT1 is projected from rear-side of grating panel, and is used for a transmission panel (Recall, e.g., 410 of FIG. 4), and makes single-path through the grating. INPUT2 is projected from front-side of grating panel, and is used for a reflection panel (Recall, e.g., 110, 212 and 312 of FIGS. 1-3, respectively), and makes a double-path through the grating (and is therefore absorbed twice, i.e., more thoroughly, by grating). The distance from point A to point C (AC) represents the first-order optical path difference ("OPD") generated from two adjacent grating lines as separated by grating space ("S"). Quantitatively, a viewer-to-viewer lateral distance ("$D_{vv}$") is determined by the following single wavelength Grating Equation, $$D_{vv} = \lambda L_V / S, \quad (1)$$

wherein $\lambda$ is wavelength of the illuminating color source, and S is design value of grating space for the color source. Specifically, in Grating Equation (1), parameters $\lambda$ and S are assumed accordingly with a specific value for each colored grating layer of a CMY-sandwiched grating panel. That is, $\lambda = \lambda_{RED}$, $S = S_{CYAN}$ for CYAN grating layer, $\lambda = \lambda_{GREEN}$, $S = S_{MAGENTA}$ for MAGENTA grating layer, and $\lambda = \lambda_{BLUE}$, $S = S_{YELLOW}$ for YELLOW grating layer.

From single wavelength Grating Equation (1), it is evident that viewer-to-viewer lateral distance ($D_{vv}$) at a far field can be directly controlled or adjusted by design value of a grating space (S). Moreover, in FIG. 7A, beam angle of the $1^{st}$ order diffraction output with respect to grating normal direction is denoted by $\beta_1$, and in this particular example, $\beta_1$ also represents incremental angle ($\Delta\beta$) between two adjacent orders of diffracted output beams, i.e., $\Delta\beta=\beta_1$.

FIG. 7B illustrates a more general case of angular multiplications of output beams via an $m^{th}$ order diffraction of a grating, in which a slightly-oblique ($\beta_{IN}\ll 1$ radian) illumination beam is projected from front-side of a reflective grating panel. In FIG. 7B, $\beta_{IN}$ indicates angle of input beam with respect to grating normal direction, $\beta_0$ presents angle of $0^{th}$ output beam with respect to grating normal direction, and $\beta_m$ denotes angle of $m^{th}$ output beam with respect to grating normal direction. Differential distance between two line sections AC and BD (i.e., AC−BD) contributes to the $m^{th}$-order optical path difference (OPD=AC−BD) generated from two adjacent grating lines as separated by grating space (S).

In designing 3-colored gratings, a coordinated (or, orchestrated) relationship is to be maintained between the three colored grating spaces, so that the arbitrary $m^{th}$ order diffraction beams from all three R/G/B colors will be directed to the same angular orientation, and the $m^{th}$ order of diffracted VVA pairs from all three R/G/B-beams will be co-focused to the same location at a far field. Upon enlisting the $m^{th}$ order grating diffraction equation (See, e.g., C. Palmer, *Diffraction Grating Handbook, $5^{th}$ Edition*, Thermo RGL—Richardson Grating Laboratory, Rochester, N.Y. (2002), incorporated herein by reference,) for each of the cyan, magenta and yellow colored gratings, respectively. Comparing the three colored equations with respect to each other, we arrive at the following orchestrated relationship between the three colored CMY-grating spaces ($S_{CYAN}$, $S_{MAGENTA}$ and $S_{YELLOW}$), $$S_{CYAN}/\lambda_{RED}=S_{MAGENTA}/\lambda_{GREEN}=S_{YELLOW}/\lambda_{BLUE} \quad (2)$$

Also, in FIGS. 7A and 7B, angular increment ($\Delta\beta$) between two neighboring orders of diffracted beams, e.g., between $m^{th}$ and $(m+1)^{th}$ beams, approximately, is:

$$\Delta\beta=\lambda/S, \quad (3)$$

wherein $\lambda$ is wavelength of the specific illuminating color source (i.e., $\lambda=\lambda_{RED}$ or $\lambda_{GREEN}$ or $\lambda_{BLUE}$), and S is design value of grating space for a specific color (i.e., $S_{CYAN}=S_{CYAN}$ or $S_{MAGENTA}$ or $S_{YELLOW}$).

FIGS. 8A-8C illustrate an example of a square-wave absorptive-amplitude grating wherein duty cycle is ½, and nominal total transmission ("NTT") is 50%. FIG. 8A illustrates a grating space transmission pattern, FIG. 8B illustrates a pixel space (i.e., half-tone dots) implementation and FIG. 8C illustrates a far-field diffraction power-amplitude distribution. Applying a simple harmonic expansion onto square-wave of FIG. 8A, we have:

$$f(x)=1+(2/\pi)\exp(j2\pi x/S)+(2/\pi)\exp(j2\pi x/S)+HOT \quad (4)$$

where (S=2P) is grating space, P denotes pixel width, "exp" presents an exponential function, "j" represents a unity imagery number, and HOT is wasted higher-order-terms. The expansion above explains that absorptive-amplitude square-wave grating of FIG. 8A can be diffracted into three effective orders ($-1^{st}$, $0^{th}$ and $1^{st}$ orders, respectively) at a far spectral field, and normalized amplitudes of the 3-diffracted orders are ($2/\pi$, 1, $2/\pi$), respectively, as demonstrated in FIG. 8C. Note that the normalized amplitude coefficients of the ($-1^{st}$ and $+1^{st}$) orders are ($2/\pi$), rather than (½), would be obtained from harmonic decomposition of a positive-only sinusoidal function, $g(x)=2[\cos(\pi x/S)]^2$. Therefore, compared with ($-1^{st}$ and $+1^{st}$) amplitude coefficients decomposed from a corresponding positive-only sinusoidal function, a multiplication factor of ($4/\pi$) has been imposed onto the ($-1^{st}$ and $+1^{st}$) amplitude coefficients decomposed from a square-wave grating.

FIGS. 9A-9C illustrate an example of a square-wave absorptive-amplitude grating (duty cycle=¼; NTT=25%) in which FIG. 9A illustrates a grating space transmission pattern, FIG. 9B illustrates a Pixel Space (half-tone dots) Implementation and FIG. 9C illustrates a far-field diffraction power-amplitude distribution.

FIGS. 10A-10C illustrate an example of a square-wave absorptive-amplitude grating (generalized case where duty cycle=1/(2K); NTT=1/(2K)) in which FIG. 10A illustrates a grating space transmission pattern, FIG. 10B illustrates a pixel space (half-tone dots) implementation and FIG. 10C illustrates a far-field diffraction power-amplitude distribution. Given k (k=1, 2, 3, . . . ), S=2 kP; W=p, DC=1/(2 k), NTT=1/(2 k) and there are (2 k+1) viewers supported.

From FIGS. 8C, 9C and 10C, it is apparent that the smaller the duty cycle of the square-wave amplitude-type gratings, the more effective orders that can be produced at the far-field spectral diffractions. Further, for all square-wave absorptive-amplitude gratings: (1) envelope of diffractive orders=Sin(Ug)/(Ug); (2) there is a non-uniform power-amplitude distribution of diffraction orders; and (3) there are slow decaying of higher-order-terms (HOT). Consequently, wasted higher diffraction orders will be causes of low power efficiency. One solution to these issues is to use fractional-square-wave gratings ("FSGs"), or in short, fractional gratings.

§ 5.1.1.1.2 Example Fractional Square-Wave Amplitude Gratings

In the following, fractional grating quintessence compound is referred to as "QC" or "FGQC", and a fractional grating's elemental binary pixel is referred to as "EBP" or "FG-EBP."

FIGS. 11A-C illustrate an example of fractional-square-wave grating in which FIG. 11A illustrates a grating space transmission pattern, FIG. 11B illustrates a pixel space (half-tone dots) implementation and FIG. 11C illustrates a far-field diffraction power distribution. In this example, there are 4p×3p elemental binary pixels ("EBPs"), and NTT=⅓. In the FIG. 11C, "BPV" means boundary of power vanishing. Each elemental binary pixel ("EBP") is a binary-valued half-tone dot. Consequently, the EBPs can be conveniently printed by a high-resolution laser printer or ink printer.

The fractional amplitude grating of FIGS. 11A-11C provides advantages including more uniform power distributions among five (5) effective diffraction orders, and sharp BPVs. Consequently, wasted higher-order-terms ("HOT") are virtually zero. This increases power uniformity and efficiency.

FIGS. 12A-C illustrates an example of Fractional-Square-Wave Grating in which FIG. 12A illustrates a Grating Space Transmission Pattern, FIG. 12B illustrates a Pixel Space (half-tone dots) Implementation and FIG. 12C illustrates a Far-field Diffraction Power Distribution. In this example, a quintessence compound ("QC" or "FGQC") is formed from 6p×4p elemental binary pixels ("EBP") or half-tone dots, and NTT=¼. As shown in FIG. 12C, this example fractional grating advantageously provides fairly uniform power distributions among seven (7) effective diffraction orders, yet wasted higher-order-terms ("HOT") are virtually zero.

FIGS. 13A-C illustrates an example of Fractional-Square-Wave Grating in which FIG. 13A illustrates a Grating Space Transmission Pattern, FIG. 13B illustrates a Pixel Space (half-tone dots) Implementation and FIG. 13C illustrates a Far-field Diffraction Power Distribution. In this example, a Quintessence Compound ("QC" or "FGQC") is formed from (2K)×(K+1) Elemental Binary Pixels or Half-Tone Dots, and NTT=1/(K+1). Referring to FIG. 13B, these amplitude gratings are referred to as "Fractional" amplitude gratings because the transmission value is (K+1) at x=0, and is (1) at x=2p, 4p, . . . . Relatively, if transmission at x=0 is normalized to Unity (100% or 1), then transmission at x=2p, 4p . . . becomes 1/(K+1), which is a fractional value, less than unity. As shown in FIG. 13C, this example fractional square-wave grating is advantageous than square-wave amplitude gratings as it provides fairly uniform power distributions among (2K+1) effective diffraction orders, while wasted higher-order-terms ("HOT") are virtually zero.

The following is a brief proof of the uniformly distributed (2K+1) discrete orders shown in FIG. 13C. First, we start with a slightly re-organized version of Lagrange Trigonometric Identity ("LTI"), i.e., $$1+\cos(2\pi x/S)+\cos(4\pi x/S)+ \ldots + \cos(2K\pi x/S)= \frac{1}{2}+\frac{1}{2} \sin[((K+\frac{1}{2})2\pi x/S)]/\sin(\pi x/S) \quad (5)$$

Wherein K is positive integer (K≥1), and S is grating space of FGQC. From the right side of the LTI, if we perform a sampling operation at x=0, ±P, ±2P, ±3P, ±4P, ±(2K−1)P, the sampled values are: $LTI_{right}$=(K+1, 0, 1, 0, 1 . . . 0), respectively, where "P" is the pixel width of EBP, and S=2KP. Now if we divide (normalize) all the sampled values of $LTI_{right}$ by (K+1), then we obtain the normalized sampled values at the right side as:

$$LTI_{right}=(1.0,1/(K+1),0,1/(K+1),0,1/(K+1) \ldots 0), \quad (6)$$

at positions: $x_i$=0, ±P, ±2P, ±3P, ±4P, ±(2K−1)P.

Now we extrapolate (via $0^{th}$-order extrapolation/expansion, or constant expansion) the sampled values at each $x_i$ to a pixel width, i.e., $[x_i-P/2, x_i+P/2]$, at all positions of: $x_i$=0, ±P, ±2P, ±3P, ±4P, ±(2K−1)P. This last extrapolated form is exactly the same amplitude distribution function of the fractional square-wave grating (FSG) as shown in FIG. 13B. (Hereafter, we also refer above "0th order extrapolation/ expansion" or "constant expansion" as "square-wave expansion").

While from left side of LTI, keeping the constant term (1) intact and multiplying all other "cos-terms" by a factor of (4/π), the left side of LTI becomes:

$$LTI_{left}=1+(4/\pi)\cos(2\pi x/S)+ (4/\pi)\cos(4\pi x/S)+ \ldots +(4/\pi)\cos(2K\pi x/S) \quad (7)$$

The multiplication factor of (4/π) is imposed onto all the "cos-terms" of $LTI_{left}$, to compensate the "square-wave expansion" as performed above onto $LTI_{right}$. (Similar to discussions previously on square-wave gratings, FIG. 8A-8C, multiplication factor of (4/π) has been imposed here onto all harmonic terms, upon comparison of a positive-only sinusoidal function to a corresponding fractional square-wave grating). $LTI_{left}$ can be rewritten as:

$$LTI_{left}=1+(2/\pi)\exp(j2\pi x/S)+(2/\pi)\exp(-j2\pi x/S)+ (2/\pi)\exp(j4\pi x/S)+(2/\pi)\exp(-j4\pi x/S)+ \ldots +(2/\pi)\exp(j2K\pi x/S)+(2/\pi)\exp(-j2K\pi x/S) \quad (8)$$

wherein S is grating space, "exp" presents an exponential function, and "j" represents a unity imagery number. Noting the uniform coefficient (2/π) positioned prior to all "exp-terms" in $LTI_{left}$, they are appropriately represented by the multiple (2/π)-valued discrete orders in FIG. 3C. Now that we have derived/proven the diffracted pattern in shown FIG. 13C is truly the spectral power distribution of the fractional square-wave grating (FSG) as shown in FIG. 13B.

From FIGS. 11C, 12C and 13C, it is evident the more elemental binary pixels ("EBPs") having been encompassed within one Quintessence Compound ("QC" or "FGQC"), the more effective orders that can be encompassed at a far-field spectral diffraction pattern. In total, fractional square-wave gratings are advantageous than square-wave amplitude gratings, owing to: (1) fairly uniform power distributions among all effective diffraction orders within BPVs and, (2) virtually fully-diminished higher-order-terms ("HOT") outside of BPVs. Note that although only horizontal diffraction orders are demonstrated here, there exist even more orders in vertical diffractions, as will be described later in § 5.2.

§ 5.1.2 Example RGB-Orchestrated Grating Multiplexing Quadri-Prism ("RGB-OGMQ") Systems In some example embodiments consistent with the present invention, the tri-chromatic orchestrated grating multiplexing apparatus ("T-OGMA") is an RGB-orchestrated grating multiplexing quadri-prism ("RGB-OGMQ"). In this section, example quadri-prisms are described in section 5.1.2.1 with respect to FIGS. 14A-15C. Example RGB-partitioned phase gratings utilized in RGB-OGMQ's are described in § 5.1.2.2 with respect to FIGS. 16A-18B. Then example RGB-OGMQ systems using quadri-prisms are described in § 5.1.2.3 with respect to FIGS. 19-22.

§ 5.1.2.1 Example Quadri-Prisms

FIGS. 14A-14C illustrate an RGB-Orchestrated Grating Multiplexing Quadri-prism ("RGB-OGMQ") in which 14A illustrates spectral reflection characteristics of a HOT mirror ("HM") and a COLD Mirror ("CM") in accordance with wavelengths of applied red, green and blue (R/G/B) sourcing beams, FIG. 14B illustrates prism construction with R/G/B line gratings and FIG. 14C illustrates prism construction with R/G/B cross gratings. Referring first to FIG. 14A, notice that the CM reflects blue wavelengths, but not other (e.g., green and red) wavelengths, while the HM reflects red wavelengths, but not other (e.g., green and blue) wavelengths. Referring to FIGS. 14B and 14C, RED components are (1) reflected up to the red gratings ("$G_{RED}$") by the HM, (2) reflected and multiplexed by the $G_{RED}$, and (3) reflected again by the HM. BLUE components are (1) reflected down to the blue gratings ("$G_{BLUE}$") by the CM, (2) reflected and multiplexed by the $G_{BLUE}$, and (3) reflected again by the CM. GREEN components (1) pass through the HM and CM, and (2) are reflected and multiplexed by the green gratings ("$G_{GREEN}$").

FIGS. 15A-15C illustrate an RGB-OGMQ having separated R/G/B gratings built on three panels of a tri-color splitting prism, in which FIG. 15A includes a HM and illustrates RED beam modulation and reflection by RED grating panel, FIG. 15B illustrates GREEN beam modulation and reflection by GREEN grating panel, and FIG. 15C includes a CM and illustrates blue beam modulation and reflection by BLUE grating panel.

As should be appreciated by the RGB-OGMQs of FIGS. 14B and 14C, these example RGB-OGMQs include (1) a porting area for receiving mixed tri-color input beams and transmitting mixed tri-color output beams, (2) a pair of cross-positioned hot and cold mirrors to split one multi-color mixed input beam into separate-oriented red, green and blue beams, and recombines returned red, green and blue beams into one mixed multi-color output beam (where the hot mirror reflects red lights and transmits green and blue lights, and the cold mirror reflects blue lights and transmits green and red lights), (3) three inner reflecting panel surfaces to reflect three split red, green and blue color beams back along their reversed directions, respectively, and (4) three-colored diffraction grating screens attached onto the three inner reflecting panel surfaces, respectively. The pitch values of the corresponding red, green and blue gratings are mutually orchestrated designed according to Equations (1) and (9), set forth below.

Some example RGB-OGMQ prisms are made of reflective phase-type gratings, and the peak-to-trough thickness of the gratings is predefined with accordance to maximum number of effective beam multiplication orders as needed. Some other example RGB-OGMQ prisms are made of reflective black-and-white amplitude-type square-wave gratings and duty-cycle of the gratings is predefined with accordance to maximum number of effective beam multiplication orders as needed. Yet some other example RGB-OGMQ prisms are made of reflective black and white amplitude-type fractional-square-wave gratings and number of the elemental binary pixels ("EBP") within a fractional grating quintessence compound ("FGQC") is predefined with accordance to maximum number of effective beam multiplication orders as needed.

§ 5.1.2.2 Example Phase Gratings

A common drawback of all amplitude absorptive gratings is low optical power throughput. More specifically, the nominal total transmission ("NTT") is always less than one. For square waves, NTT=1/(2 k), which is much less than 1 when k is large. For fractional square waves, NTT=1/(k+1) which is approximately a two-fold improvement from that of the square waves. Nevertheless, NTT=1/(k+1), is still much less than 1 when k is very large. Therefore, it may be more useful to use phase gratings instead.

FIGS. 16A-16E illustrate reflective phase grating examples in which FIG. 16a illustrates a phase grating having a sinusoidal cross-sectional profile, FIG. 16B illustrates a phase grating having a cylindrical concave cross-sectional profile, FIG. 16C illustrates a phase grating having a cylindrical convex cross-sectional profile, FIG. 16D illustrates a phase grating having a square cross-sectional profile, and FIG. 16E illustrates a phase grating having a triangular cross-sectional profile. Each grating modulates a single wavelength/color beam separately.

FIG. 17A illustrates a phase modulation of a uniform wave front (single wavelength beam having ideally flat wave-front) by a sinusoidal (single-harmonic) reflection phase-grating panel, and FIG. 17B illustrates a conventional technique for fabricating a sinusoidal phase-grating reflection panel via 2-collimated laser beams interference and photo-lithographic processing.

Diffracted patterns at far fields from sinusoidal phase gratings can be conveniently analyzed with application of a Jacobi-Anger Identity. (See, e.g., J. W. Goodman, *Introduction to Fourier Optics,* $3^{rd}$ Edition, Roberts & Company, Englewood, Colo. (2005), and especially section 4.4.4: Thin Sinusoidal Phase Grating, pp. 82-84, incorporated herein by reference.) In short, the Jacobi-Anger Identity can translate (equivalently) a single-harmonic sinusoidal phase gratings into a series of single-harmonic sinusoidal amplitude-type gratings. The amplitudes of the serial single-harmonic amplitude-type gratings are quantified by a Bessel's serial functions of the first kind $[J_n(H_{PP})$, for n=0, ±1, ±2, ±3, . . . ], and wherein $H_{PP}$ is peak-to-peak height (also referred to as "peak-to-trough thickness") of sinusoidal phase grating shown in FIG. 17A.

Generally, by increasing $H_{PP}$ in FIG. 17A, more and more non-zero useful orders are produced at the diffracted far field. However, performances of a single-harmonic sinusoidal phase grating are not always desirable. One adherent issue with it is the non-uniform magnitudes among all useful Bessel coefficients. Another hurdle is the slowly decaying trend of the un-used HOT terms (which results in the waste of power efficiency).

FIGS. 18A and 18B illustrate the modulation of a uniform wave front (single wavelength beam having ideally flat wave-front) by a cylindrical concave (or convex) reflective phase grating in which FIG. 18A illustrates modulation of uniform wave front by a singlet concave cylindrical reflector, and FIG. 18B illustrates modulation of uniform wave front by multiple concave cylindrical mini-reflectors (i.e., reflective phase grating).

In FIGS. 18A and 18B, S denotes space of the phase grating, $L_V$ indicates distance from grating plane to viewer space, and $f_{CC}$ represents focal length of a concave cylindrical reflector. When S and $f_{CC}$ are assigned the same values in both FIGS. 18A and 18B, the diffracted beams at a far-field of both Figures will subtend the same angular extend, within the same boundaries of power vanishing ("BPVs"). Within BPVs, however, the far-field diffraction of FIG. 18A generates a continuous and uniform distribution, while the far-field diffraction of FIG. 18B harvests a plurality of focused/discrete distributed orders with a uniform magnitude among all orders.

Although only concave mini-reflectors are delineated explicitly in FIGS. 18A and 18B, it should be noted that similar convex cylindrical mini-reflectors of same grating space (S) and same focal length (fcc) as in FIGS. 18A and 18B will work equally well. This is because, since, in reality, $L_V \gg f_{CC}$, concave and convex reflectors of equal parameters will accomplish the same diffraction/multiplication patterns at the far fields.

When dual images from a dual-projector are impinging onto the phase grating panel of FIG. 18B, similar to CMY-amplitude grating cases, multiple VVA pairs at a far filed ("$L_V$") from grating plane can be generated. In FIG. 18B, similar to the amplitude grating embodiments of FIGS. 7A and 7B, $\beta_1$ represents diffraction angle of $1^{st}$ order output beam with respect to grating normal direction, and $\Delta\beta$ denotes incremental angle between two adjacent orders of diffracted output beams. Note that $(\Delta\beta=\beta_1)$ is also approximately true in this example case, due to the fact that INPUT beam in FIG. 18B is impinging onto the grating panel along its normal direction. Quantitatively, at a far field, a viewer-to-viewer lateral distance between two adjacent VVA pairs ("$D_{vv}$") is dominated by the same Grating Equation (1) as the CMY-gratings (i.e., $D_{vv}=\lambda \cdot L_v/S$, where $L_v$ indicates distance from phase grating plane to viewer space, $\lambda$ is wavelength of the illuminating color source, and S is design value of phase grating space). In Grating Equation (1), parameters $\lambda$ and S shall take their own specific value for each of the three RGB-partitioned grating panels. (See, e.g., FIGS. 14 and 15.) That is:

$\lambda=\lambda_{RED}, S=S_{RED}$—for RED grating panel, $\lambda=\lambda_{GREEN}, S=S_{GREEN}$—for GREEN grating panel, and $\lambda=\lambda_{BLUE}, S=S_{BLUE}$—for BLUE grating.

For similar reasons as in CMY-sandwiched gratings, a coordinated/orchestrated relationship is preserved between the three grating spaces of three R/G/B-colored phase gratings. That is:

$$S_{RED}/\lambda_{RED}=S_{GREEN}/\lambda_{GREEN}=S_{BLUE}/\lambda_{BLUE} \qquad (9)$$

Generally, for various forms of phase gratings (e.g., FIGS. 16A-17B), it is true that the deeper the peak-to-peak thickness ($H_{PP}$) of the gratings, the more effective diffraction orders that can be harvested at far-field spectral patterns. This general trend can be explicitly demonstrated in detail using the concave cylindrical mini-reflectors shown in FIG. 18B. In FIGS. 18A and 18B, when $H_{PP} \gg f_{CC}$, the following relationship is approximately true and valid:

$$f_{CC} = S^2/(16\, H_{PP}) \tag{10}$$

From Equation (10) above, it is apparent when that when grating space ("S") is given with a fixed value, a larger peak-to-peak depth value ("$H_{PP}$") will result in a decreased focal distance ("$f_{CC}$") and accordingly, a further widely spread power spectrum at the far-field with more effective (and uniformly distributed) diffraction orders.

In short, concave (or convex) cylindrical phase-type gratings (such as shown in FIG. 18B) can deliver the following outstanding characteristics over other grating types:
 (1) Nearly perfect optical throughput or power efficiency, as the nominal total transmission ("NTT") is approaching to 100%;
 (2) Fairly uniform power distributions among all designed effective diffraction orders (see FIG. 18B, all orders are of uniform magnitude within BOVs-boundary of power vanishing); and
 (3) Wasted higher-order-terms ("HOT") are virtually vanished (see FIG. 18B, no non-zero orders appeared outside of BOVs.)

§ 5.1.2.3 Example RGB-OGMQ Systems

FIG. 19 illustrates a 3D Display system 1900 as a first example of an RGB-OGMQ system, which includes a projector 1920 and an RGB-OBMQ prism 1960. Three gratings (R/G/B) are provided on three separated concave panels of the RGB-OGMQ prism 1960. Although these three inner panel surfaces can be made concave parabolic, in practice they can often be fabricated concave spherical for reduced costs during manufacturing. The projector 920 produces left and right projections ($P_L$ and $P_R$), and is separated from the prism 1960 by a distance of L. That is, in the example system of FIG. 19, the panel focusing device 1960 is comprised of three separated concave reflective panels, wherein each panel is positioned in a separated beam path of the red, green and blue color beams and is used to both focus and reflect the red, green and blue color beams, respectively. The panel focusing device 120 receives the left and right projections of the projector 120 and reflects them to left and right virtual volumetric apertures ($VVA_L$ and $VVA_R$), each separated by pupil-to-pupil distance ($D_{PP}$), located at a distance $L_V$ from the prism 1960. In the example system 1900 of FIG. 19, the projection plane JKEF is provided at an angle ϕ to reflection plane GHEF. Although the first example system 1900 of FIG. 19 provides a fine, glass-free, multiplexed, 3D display, when the display size is large, so are the sizes of the grating screens on the curved reflection panels and hot and cold beam splitting mirrors (HM and CM). As a result, its size is relative large and its production is relatively expensive.

FIG. 20A illustrates a 3D Display system 2000 as a second example of an RGB-OGMQ system. The second example RGB-OGMQ system 2000 includes a projector 2020, a multiplexing prism 2062 in which three gratings (R/G/B) are provided on three flat panels, and a convex lens 2064 arranged at a front face of the multiplexing prism 2062. Lateral distance between two adjacent viewers is marked as viewer-to-viewer distance ("$D_{VV}$"), and pupil-to-pupil distance between a pair of $VVA_L$ and $VVA_R$ is labeled as ("$D_{PP}$") in the VVA-space. FIG. 20B illustrates a modified second example RGB-OGMQ system 2000' in which a larger gap ($\Delta_{FG}$) is provided between the multiplexing prism 2062' and the convex lens 2064. This larger gap permits the size of the multiplexing prism 2062' to be reduced relative to the multiplexing prism 2062 of the system 2000. In both systems 2000 and 2000', the focusing panel device is composed of a transparent convex lens 2064 permitting double-path of input and output tri-color beams. Advantageously, Grating screens on flat reflection panels are relatively easier to make. However, in the second example system 2000 of FIG. 20A, when the display size is large, so are sizes of grating screens, and hot and cold beam splitting mirrors (HM and CM). As a result, its size is relatively large and its production still remains relatively expensive. By adding gap $\Delta_{FG}$, the modified second example system 2000' of FIG. 20B permits a much smaller (e.g., about 50%~95% smaller than that in system 2000) multiplexing prism to be used.

FIGS. 21 and 22 illustrate a 3D Display system 2100 as a third example of an RGB-OGMQ system. This third example system 2100 includes a projector 2120, an OGMQ prism 2162, a large concave mirror panel 2166 and a baffle 2168. In theory, the surface of the large mirror panel 2166 can be made concave parabolic. In practice, however, it may be preferred to be concave spherical in order to reduce manufacturing costs. The shared large concave mirror panel 2166 reflects a projector image pair, and multiplexed VVA pairs. FIG. 21 is a general perspective view of the third example RGB-OGMQ system 2100, and FIG. 22 is a side-projection view of the triple-folded optical system 2100 of FIG. 21. FIG. 22 shows a distance ("$L_{PROJ}$") between the projector 2120 and the concave mirror panel 2166, a distance ("$L_V$") between the concave mirror panel 2166 and the VVAs, a distance ("$\Delta_{FG}$") between the concave mirror panel 2166 and the OGMQ prism 2162, and a focal length ("$f_{CP}$") of the concave panel 2166. By means of triple-folded optical reflections, system 2100 accomplishes two (2) unique and major advantages over others. First, the size of OGMQ prism 2162 can be reduced or miniaturized, thus resulting in lowered cost of production. Second, output screen for 3D visualization can be significantly augmented, further enriching 3D visual experience for viewers, especially for a large audience.

In FIGS. 21 and 22, angle $\phi_2$ is defined as system's total resulting angle between dual-projector plane (ABCD) and viewers' observation plane (HGJK), while angle $\phi_1$ is defined locally between beam-input plane (ABEF) and beam-output plane (HGEF), to and from miniaturized Qudri-prism 2162, respectively. Both angles $\phi_1$ and $\phi_2$ should be maintained to values as small as possible (e.g., 0 to 20 degrees). Note that in the drawings, angles $\phi_1$ and $\phi_2$ are intentionally exaggerated, for purpose of illustration.

Additionally, distance ("$\Delta_{PROJ}$") is defined between the projector 2120 and the OGMQ prism 2162, and distance ("$\Delta_V$") is defined between the OGMQ prism 2162 and the VVAs. The last two distances ("$\Delta_{PROJ}$" and "$\Delta_V$") are optional and flexible parameters. By coordinated adjustments of both distances ("$\Delta_{PROJ}$" and "$\Delta_V$"), projection space can be reduced and viewing space (and visual sizes of 3D images) can be further magnified.

As shown, left and right images projected from the projector 2120 are (1) reflected by the concave mirror panel 2166 towards the OGMQ prism 2162, (2) reflected and multiplexed by the OGMQ prism 2162 and directed back towards the concave mirror panel 2166. The multiplexed left and right images are then reflected by the concave mirror panel 2166 a second time and directed/focused towards the virtual volume aperture pairs (VVAs)

The third example RGB-OGMQ system 2100 can apply a smaller multiplexing prism having flat, smaller, tri-grating panels. This implementation effectively reduces production costs while significantly augmenting the displayed screen for 3D viewing.

Further, as another design alternative, large concave mirror panel 2166 can be split into two separate concave spherical or parabolic mirrors, each having a radius of curvature R1 and R2, respectively. (See the Insert of FIG. 22.) The two reflectors share a common optical axis OO' and a common focusing point (co-axial and co-focal), and are placed at different depths from the RGB-OGMQ. When the curvatures are made to be (R2>R1), additional design optimizations can be accomplished by further reducing dimensions of projection space and augmenting dimensions of viewing space and that of 3D visual images.

Alternatively, the systems of FIGS. 20B, 21 and 22 can be altered by replacing the RGB-OGMSs with a single small-sized CMY-OGMSS. To do so, a small and flat CMY-sandwiched screen (as described above) can be placed on plane RSWV of the prism.

§ 5.1.2.4 Alternative RGB-OGMQ Systems by Incorporating Black-and-White Amplitude Gratings on Partitioned RGB-Panels Note that although square-wave and fractional square-wave amplitude CMY-gratings were described for use in CMY-OGMSS systems (Recall §§ 5.1.1.1.1 and 5.1.1.1.2.), alternatives to the example R/G/B phase gratings used in FIGS. 14B-15C (and therefore to the RGB-OGMQ systems of FIGS. 19A-22) can be made by also applying all amplitude-type gratings (both square-wave and fractional square-wave types) to the partitioned 3-RGB panels.

Nevertheless, as R/G/B beams are already well-separated via the hot and cold mirrors in a Quadri-prism prior to impinging onto the gratings, spectral "independent and un-overlapping" properties for CMY-sandwiched gratings as described previously (Recall FIGS. 6A-6D and § 5.1.1.1.) are no longer needed. Indeed, in place of the RGB phase gratings of an RGB-OGMQ system, wide-band absorptive black-and-white amplitude-type gratings can be simply implemented onto the three inner reflective panels. Similar to CMY-type amplitude gratings, black-and-white amplitude gratings can be made of either square-wave or fractional square-wave types (e.g., lines or half-tone dots).

Also, black-and-white grating space ("S") as implemented onto each of the partitioned RGB panels shall be individually selected by the same Grating Equation (1) for each of the R/G/B colored beams. Further, to ensure all R/G/B output beams to each diffraction order are multiplexed into the same synchronized position at the viewers' far-field, same as for CYM-amplitude and RGB-phase gratings, the same orchestrated grating-spacing relationships (as discussed previously) are executed between the three sets of black-and-white amplitude gratings built on the three inner reflective panels of an RGB-OGMQ system (Recall Equation 9.)

Although the diffraction efficiencies of black-and-white amplitude-type gratings shall by no means match those of the phase gratings, the ease of fabrication and lowered costs may find some applications for black-and-white amplitude grating-based RGB-OGMQ systems.

§ 5.2 Refinements

FIG. 23 illustrates a so-called "Rowland-Circled" configuration of viewers' space along an arc in order to optimize the focusing spaces for the VVA pairs. This may be used in systems using a CMY-OGMSS or RGB-OGMQ, such as those discussed above with reference to FIGS. 1-4 and FIGS. 19-21. In FIG. 23, $R_{GP}$ is the radius of curvature of multiplexing display panel, and the Rowland Circle is placed tangential to panel surface at center point of the display panel. The diameter of the Rowland Circle is determined by $R_{GP}$, and optimal focusing points for VVA pairs are located on the Rowland Circle at the far side of the Circle. $L_V$ is distance from multiplexing display panel to focusing space of VVA pairs, and is set to equal to diameter of the Rowland Circle. In example systems as shown in FIG. 1 or 4, diameters of Rowland Circles can be explicitly set to radius of curvatures of multiplexing display panels (110 or 410). In other example systems, such as shown in FIGS. 2-3, and 19-21, are not explicitly demonstrated. Nevertheless effective Rowland Circles and their diameters can be deduced from the optical configurations.

Figure 24A:
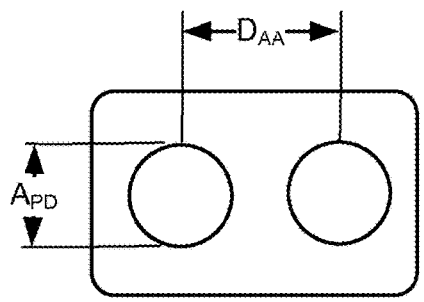
Figure 24B:
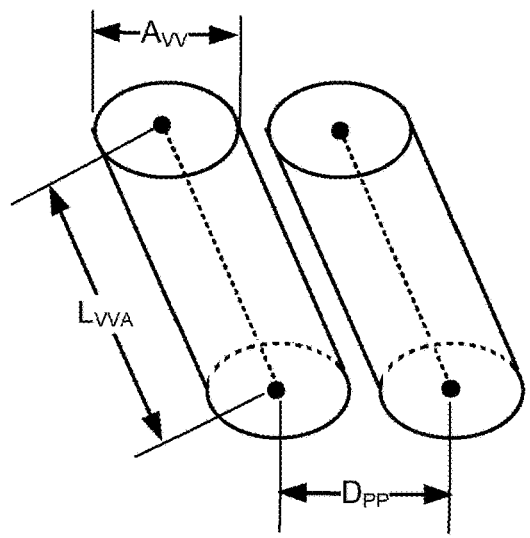
Figure 24C:
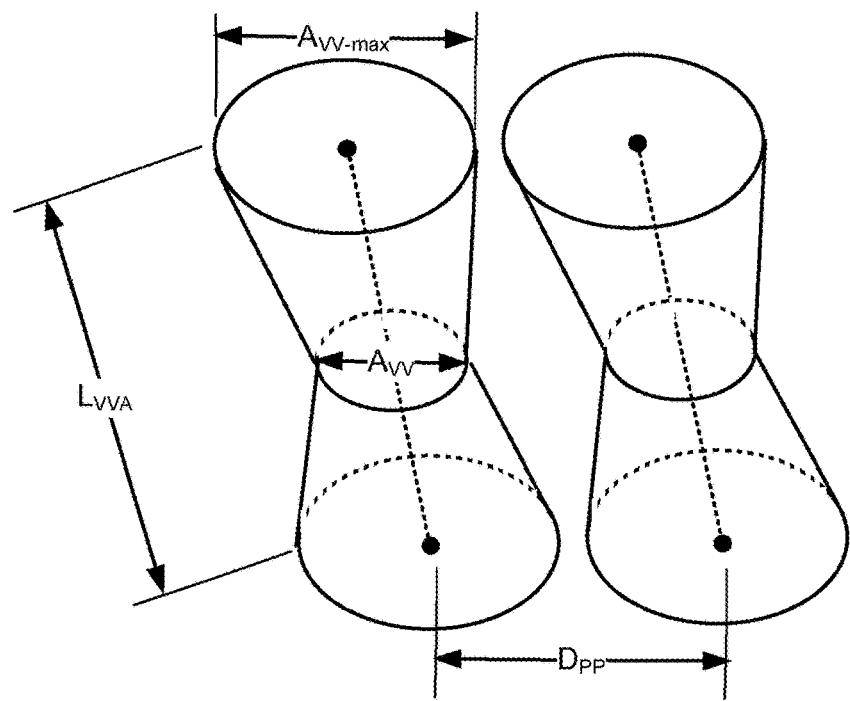
Figure 24D:
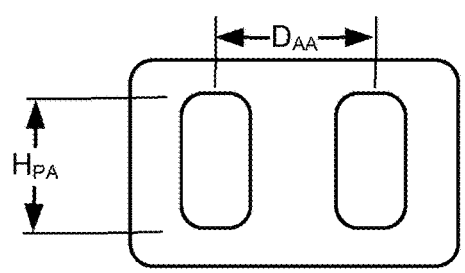
Figure 24E:
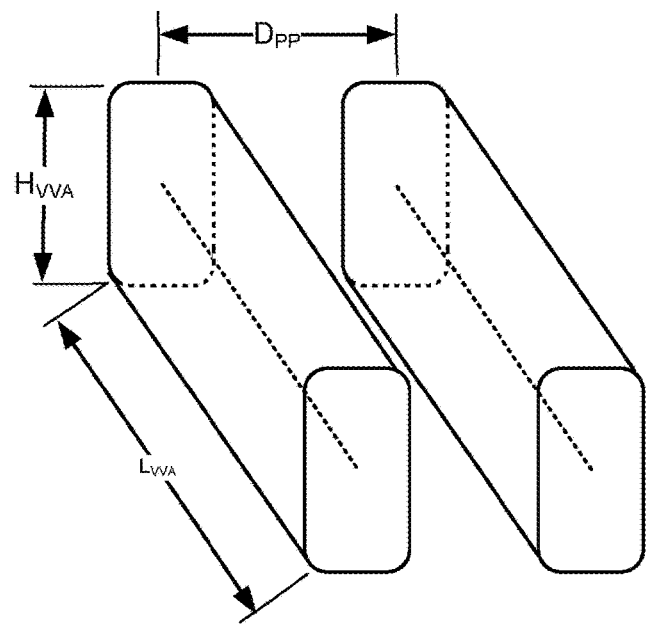
Figure 24F:
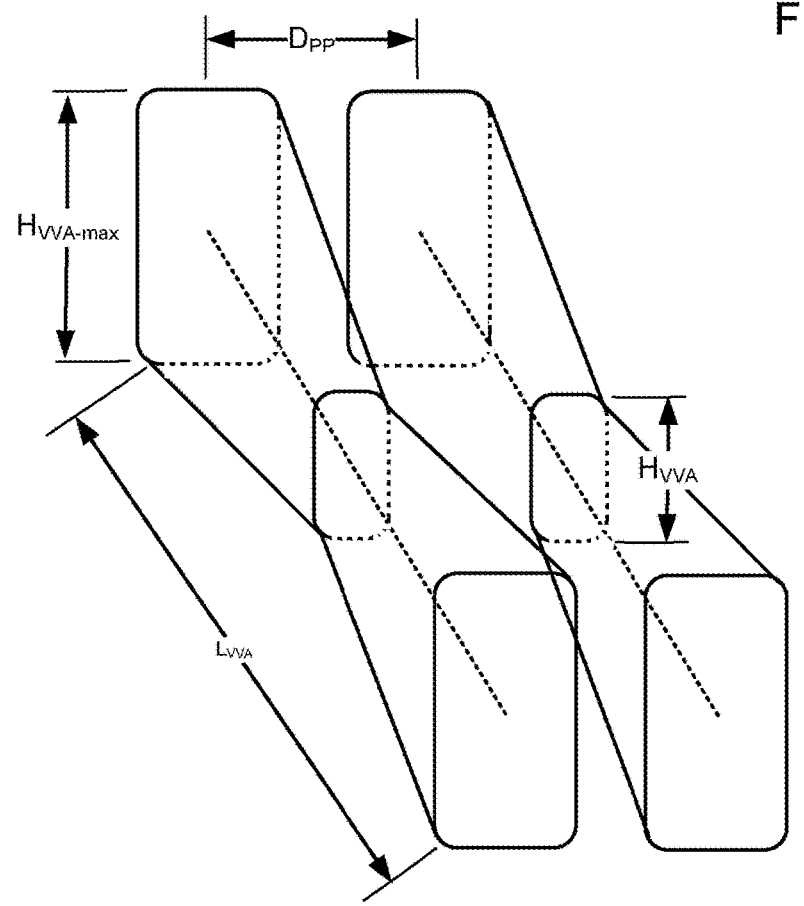

FIGS. 24A-24F illustrate the size, shape, and blurring effects of projector apertures on VVA pairs. For example, FIG. 24A illustrates a pair of circular projection apertures of the dual-image projector, whereas diameter of the dual apertures is defined as $A_{PD}$, and center-to-center separation between the two apertures is marked as $D_{AA}$. FIG. 24B illustrates the resulting VVA pair without considering blurring effects, while FIG. 24C illustrates the resulting VVA pair with blurring effects considered along the VVA depth. $D_{PP}$ denotes the resulting center-to-center separation between $VVA_L$ and $VVA_R$, and $A_{VV}$ denotes effective lateral diameter of a resulting VVA. $L_{VVA}$ denotes the effective and useful depth of a VVA, and the quantity of $L_{VVA}$ is chosen between two ends of a VVA when a blurring $VVA_L$ starts to overlap with a $VVA_R$. Similarly, FIG. 24D illustrates a pair of substantially rectangular projection apertures of the dual-image projector. FIG. 24E illustrates the resulting VVA pair without considering blurring effects, while FIG. 24F illustrates the resulting VVA pair with blurring effects considered along VVA depth. Quantitatively, assuming that $M_{AP}$ is the overall lateral 2D magnification from a projector's dual aperture plane to a VVA space, the resulting center-to-center separation ("$D_{PP}$") between $VVA_L$ and $VVA_R$ is determined by the product between $M_{AP}$ and $D_{AA}$, that is:

$$D_{PP}=M_{AP}D_{AA}; \qquad (11)$$

and, the effective lateral diameter ("$A_{VV}$" of a resulting VVA is determined by the product between $M_{AP}$ and $A_{PD}$. That is:

$$A_{VV}=M_{AP}A_{PD}. \qquad (12)$$

FIGS. 25A-25C illustrate a flat multiplexing display panel incorporating front-side focusing means via a convex singlet lens, an achromatic duplex lens, or an achromatic triplex lens, which may be used as focusing lenses in the example systems illustrated in FIGS. 2, 4, 20A and 20B. More specifically, FIG. 25A is a cross section view illustrating a flat panel display 2510 having a convex singlet lens 2520*a* (e.g., crown type, low dispersion) between the flat panel display 2510 and the viewer(s) (not shown). FIG. 25B is a cross section view illustrating a flat panel display 2510 having a convex achromatic doublet lens 2520*b* (e.g., with Flint and Crown curvatures; concave and convex) between the flat panel display 2510 and the viewer(s) (not shown). FIG. 25C is a cross section view illustrating a flat panel display 2510 having a convex achromatic triplet lens 2520*c* (e.g., Crown-Flint-Crown; convex, concave, convex) between the flat panel display 2510 and the viewer(s) (not shown). By the use of the focusing power of a lens (i.e., 2520*a*, 2520*b* or 2520*c*), light beams emerging from an array of pixels that are mounted on the flat display panel (2510) can be focused onto a single point at a viewer's space (not shown), which is a point located at far-field from the display panel). More precisely, when presence of optical aberrations and diffraction effects are considered, these light beams emerging from an array of pixels of the flat panel are focused at the vicinity of a single point (not shown), and this vicinity region in space constitutes a VVA as we described previously. In FIGS. 25B and 25C, achromatic duplex lens 2520*b* and achromatic triplex lens 2520*c* operate similarly as singlet lens 2520*a*, but provide better compensations of the chromatic dispersions than singlet lens 2520*a*.

FIG. 26 illustrates the use of 2D crossed gratings 2610 for multiplexing a VVA pair into a 2D array 2620 of plurality VVA Pairs. More specifically, the 2D crossed gratings 2610 multiplex a VVA pair both horizontally and vertically to an "Opera Hall-style" viewing field configuration 2620. Note that although a back-projection system with a transmission screen is illustrated in FIG. 26, 2D crossed gratings 2610 can also be applied to all front-projection systems with reflection screens. (Recall, e.g., the systems of FIGS. 1-3 and 19-22.) Please also note that 2D cross gratings 2160 can be applied to all amplitude gratings of square-wave type and to all phase gratings. However, for fractional square-wave amplitude gratings, a VVA pair is already (inherently) multiplexed into a 2D array).

What is claimed is:

1. A projection three dimensional (3D) display system for providing glass-free, 3D display to a plurality of viewing volumetric pairs (VVAs) in space corresponding to a hypothetical plurality of viewers' eye aperture pairs, the projection 3D display system comprising:
    a) a dual-image projector configured to project both a left viewing tri-color image and a right viewing tri-color image; and
    b) a tri-chromatic orchestrated grating multiplexing apparatus ("T-OGMA") for
        1) receiving a tri-color mixed input beam encompassing the left and right viewing tri-color images,
        2) multiplying the tri-color mixed input beam into a plurality of tri-color mixed output beams, and
        3) focusing the plurality of tri-color mixed beams for viewing at the VVAs.

2. The projection 3D display system of claim 1 wherein a center-to-center distance ($D_{vv}$) between two adjacent VVA pairs of each color is controlled by a relationship:

$$D_{VV} = \lambda L_V / S,$$

wherein $\Delta$ is wavelength of the illuminating color source, $L_V$ is a viewer-to-grating distance and S is design value of grating space for the color source.

3. The projection 3D display system of claim 1 wherein the T-OGMA for receiving, multiplying and focusing include three-colored diffraction gratings, and wherein pitch values of all three-colored diffraction gratings are mutually-orchestrated according to an orchestrated relationship between the three colored CMY-grating spaces ($S_{CYAN}$, $S_{MAGENTA}$ and $S_{YELLOW}$), $$S_{CYAN}/\lambda_{RED} = S_{MAGENTA}/\lambda_{GREEN} = S_{YELLOW}/\lambda_{BLUE},$$

or, according to an orchestrated relationship between the three colored RGB-grating spaces ($S_{RED}$, $S_{GREEN}$ and $S_{BLUE}$), $$S_{RED}/\lambda_{RED} = S_{GREEN}/\lambda_{GREEN} = S_{BLUE}/\lambda_{BLUE},$$

so that the center-to-center distances between two adjacent VVA pairs of all three colors are made identical.

4. The projection 3D display system of claim 3 wherein pitch values of the three-colored diffraction gratings are so designed that the resulting center-to-center distance between two adjacent VVA pairs ($D_{vv}$) is larger or equal to two times (2×) of the left-to-right separation ($D_{pp}$) between VVA$_L$ and VVA$_R$ of an VVA pair so that overlaps between different orders of VVA pairs are prevented.

5. The projection 3D display system of claim 3 wherein the three-colored diffraction gratings are made of one-dimensional parallel line gratings.

6. The projection 3D display system of claim 3 wherein the three-colored diffraction gratings are made of two-dimensional orthogonally-crossed gratings.

7. The projection 3D display system of claim 1 wherein the T-OGMA for receiving, multiplying and focusing is configured to (1) focus both a left projection aperture and a right projection aperture of the dual-image projector to a distant viewing field, (2) create a left virtual volumetric aperture and a right virtual volumetric aperture (VVA$_L$ and VVA$_R$), (3) determines the cross-sectional sizes of both VVA$_L$ and VVA$_R$, and (4) controls the left-to-right separation ($D_{pp}$) between VVA$_L$ and VVA$_R$.

8. The projection 3D display system of claim 1 wherein the T-OGMA for receiving, multiplying and focusing include a CMY-Orchestrated Grating Multiplexing Sandwich Screen ("CMY-OGMSS") embracing three layers of amplitude-modulated absorption gratings, each of the three layers made of cyan, magenta and yellow colored gratings, respectively,
    wherein cyan, magenta and yellow grating lines are arranged parallel with respect to each other, the three grating layers are constructed one on top of another in a sandwich-style, and pitch values of the corresponding cyan, magenta and yellow gratings are mutually-orchestrated designed according to an orchestrated relationship between the three colored CMY-grating spaces ($S_{CYAN}$, $S_{MAGENTA}$ and $S_{YELLOW}$):

$$S_{CYAN}/\lambda_{RED} = S_{MAGENTA}/\lambda_{GREEN} = S_{YELLOW}/\lambda_{BLUE}.$$

9. The projection 3D display system of claim 8 wherein the CMY-OGMSS for receiving, multiplying and focusing includes a concave spherical or parabolic panel reflector and wherein the gratings sandwich screen is built onto a front surface of the concave panel reflector.

10. The projection 3D display system of claim 8 wherein the CMY-OGMSS for receiving, multiplying and focusing include (1) a transparent convex lens permitting double-path of projection input and viewing output beams, and (2) a flat reflecting panel having a front surface provided with the CMY-Orchestrated Grating Multiplexing Sandwich Screen.

11. The projection 3D display system of claim 8 wherein the CMY-OGMSS for receiving, multiplying and focusing include (1) a cylindrical reflective base panel, having its axis of symmetry in the vertical direction, and (2) a transparent convex cylindrical lens, having its axis of symmetry in the horizontal direction and permitting double-path of input and output beams, and having a front surface provided with the CMY-Orchestrated Grating Multiplexing Sandwich Screen.

12. The projection 3D display system of claim 8 wherein the CMY-OGMSS for receiving, multiplying and focusing includes a transparent convex lens permitting a single-path of polychromatic beams from the dual projector to the VVAs, and having a front, a rear surface or an interior volume provided with the CMY-Orchestrated Grating Multiplexing Sandwich Screen.

13. The projection 3D display system of claim 8 wherein the focusing panel device includes a concave panel reflector that reflects and focuses a first time onto the projected beams at input beam-path and reflects and focuses a second time onto the viewing beams at output beam-path, and wherein the CMY-Orchestrated Grating Multiplexing Sandwich Screen is provided at a front surface of a flat reflecting panel.

14. The projection 3D display system of claim 8 wherein the CMY-Orchestrated Grating Multiplexing Sandwich Screen is made of amplitude-type square-wave gratings and a duty-cycle of the gratings are predefined in accordance with a specified maximum number of effective beam multiplication orders.

15. The projection 3D display system of claim 8 wherein the CMY-Orchestrated Grating Multiplexing Sandwich Screen is made of amplitude-type fractional square-wave gratings (FSG) and a number of elemental binary pixels (EBP) within a fractional grating quintessence compound (FGQC) is predefined in accordance with a specified maximum number of effective beam multiplication orders.

16. The projection 3D display system of claim 1 wherein the T-OGMA for receiving, multiplying and focusing include an RGB-Orchestrated Grating Multiplexing Quadri-prism (RGB-OGMQ) having (i) a porting area for receiving mixed tri-color input beams and transmitting mixed tri-color output beams, (ii) a pair of cross-positioned hot and cold mirrors to split one multi-color mixed input beam into separate-oriented red, green and blue beams, and recombines returned red, green and blue beams into one mixed multi-color output beam, wherein the hot mirror reflects red lights and transmits green and blue lights, and the cold mirror reflects blue lights and transmits green and red lights, (iii) three inner reflecting panel surfaces to reflect three split red, green and blue color beams back along their reversed directions, respectively, and (iv) three-colored diffraction grating screens attached onto the three inner reflecting panel surfaces, respectively, wherein pitch values of the corresponding red, green and blue gratings are mutually-orchestrated according to the relationship:

$$S_{RED}/\lambda_{RED}=S_{GREEN}/\lambda_{GREEN}=S_{BLUE}/\lambda_{BLUE}.$$

17. The projection 3D display system of claim 16 wherein the RGB-Orchestrated Grating Multiplexing Quadri-prism is made of reflective phase-type gratings and a peak-to-trough thickness of each of the grating is predefined in accordance with a predetermined maximum number of effective beam multiplication orders.

18. The projection 3D display system of claim 16 wherein the RGB-Orchestrated Grating Multiplexing Quadri-prism is made of reflective cylindrical phase-type concave or convex gratings.

19. The projection 3D display system of claim 16 wherein the RGB-Orchestrated Grating Multiplexing Quadri-prism is made of reflective black-and-white amplitude-type square-wave gratings and a duty-cycle of each of the gratings is predefined in accordance with a predetermined maximum number of effective beam multiplication orders.

20. The projection 3D display system of claim 16 wherein the RGB-Orchestrated Grating Multiplexing Quadri-prism is made of reflective black-and-white amplitude-type fractional-square-wave gratings and a number of the elemental binary cells (EBC) within a fractional grating quintessence compound (FGQC) is predefined in accordance with a predetermined maximum number of effective beam multiplication orders.

21. The projection 3D display system of claim 16 wherein the RGB-OGMQ for receiving, multiplying and focusing include three separated concave reflective panels, wherein each of the three concave reflective panels is spherical or parabolic-shaped, and is positioned in a separated beam path of a respective one of the red, green and blue color beams and is used to both focus and reflect the respective red, green and blue color beams.

22. The projection 3D display system of claim 16 wherein the RGB-OGMQ for receiving, multiplying and focusing include a transparent convex lens permitting double-path of input and output tri-color beams.

23. The projection 3D display system of claim 16 wherein the RGB-OGMQ for receiving, multiplying and focusing include a concave spherical or parabolic panel reflector that reflects and focuses the first time onto the projected beams at input beam-path and reflects and focuses the second time onto the viewing beams at output beam-path.

* * * * *